(12) United States Patent
Ohlsson et al.

(10) Patent No.: US 11,166,316 B2
(45) Date of Patent: Nov. 2, 2021

(54) WIRELESS DEVICE, A NETWORK NODE AND METHODS THEREIN FOR TRANSMISSION AT A CHANGED COVERAGE ENHANCEMENT (CE) LEVEL IN A RANDOM ACCESS PROCEDURE

(71) Applicant: Telefonaktiebolaget LM Ericsson (publ), Stockholm (SE)

(72) Inventors: Oscar Ohlsson, Stockholm (SE); Andreas Höglund, Solna (SE); Ali Nader, Malmö (SE); Béla Rathonyi, Lomma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 423 days.

(21) Appl. No.: 15/781,391

(22) PCT Filed: Nov. 10, 2017

(86) PCT No.: PCT/SE2017/051120
§ 371 (c)(1),
(2) Date: Jun. 4, 2018

(87) PCT Pub. No.: WO2018/139964
PCT Pub. Date: Aug. 2, 2018

(65) Prior Publication Data
US 2020/0275489 A1    Aug. 27, 2020

Related U.S. Application Data

(60) Provisional application No. 62/451,783, filed on Jan. 30, 2017.

(51) Int. Cl.
*H04W 74/00* (2009.01)
*H04W 74/08* (2009.01)
(Continued)

(52) U.S. Cl.
CPC ....... *H04W 74/0833* (2013.01); *H04W 24/08* (2013.01); *H04W 72/0453* (2013.01); *H04W 74/006* (2013.01); *H04W 74/02* (2013.01)

(58) Field of Classification Search
None
See application file for complete search history.

(56) References Cited

U.S. PATENT DOCUMENTS

2015/0016312 A1\* 1/2015 Li .............................. H04L 5/14
370/280
2016/0353440 A1\* 12/2016 Lee ................... H04W 72/0453

FOREIGN PATENT DOCUMENTS

EP    3079431 A1    10/2016
GB    2552838 A  \*  2/2018   ............ H04W 68/02
(Continued)

OTHER PUBLICATIONS

International Search Report and Written Opinion dated Jan. 29, 2018 for International Application No. PCT/SE2017/051120 filed on Nov. 10, 2017, consisting of 16-pages.
(Continued)

*Primary Examiner* — Ajit Patel
*Assistant Examiner* — Pamit Kaur
(74) *Attorney, Agent, or Firm* — Christopher & Weisberg, P.A.

(57) ABSTRACT

A wireless device and a method therein for performing a transmission at a changed Coverage Enhancement (CE) level in a random access procedure. The wireless device receives a random access order indicating a first preamble and a first carrier. Further, the wireless device transmits, to a network node, the first preamble on the first carrier using a first CE level. In the absence of a valid response after a number of transmissions, the wireless device determines a second CE level that is different from the first CE level. Thereafter, the wireless device selects, in a predictable way
(Continued)

for the network node, a carrier that is supporting the second CE level, and transmits, to the network node, a preamble on the carrier using the second CE level.

25 Claims, 9 Drawing Sheets

(51) Int. Cl.
*H04W 24/08* (2009.01)
*H04W 72/04* (2009.01)
*H04W 74/02* (2009.01)

(56) References Cited

FOREIGN PATENT DOCUMENTS

| KR | 10-2011-0054005 | 5/2011 |
|---|---|---|
| WO | 2010019524 A2 | 2/2010 |
| WO | 2016167570 A1 | 10/2016 |

OTHER PUBLICATIONS

3GPP TS 36.321 V14.0.0; 3rd Generation Partnership Project; Technical Specification Group Radio Access Network Evolved Universal Terrestrial Radio Access (E-UTRA); Medium Access Control (MAC) protocol specification (Release 14); Sep. 2016, consisting of 96-pages.
3GPP TS 36.331 V14.0.0; 3rd Generation Partnership Project; Technical Specification Group Radio Access Network Evolved Universal Terrestrial Radio Access (E-UTRA); Radio Resource Control (RRC); Protocol specification Release 14); Sep. 2016, consisting of 644-pages.
3GPP TSG-RAN WG2 Meeting#95 R2-164859; Title: Consideration for PRACH on multi-carrier in NB-IoT; Source ZTE; Agenda Item: 8.11.2; Document for: Discussion and Decision; Location and Date: Gothenburg, Sweden, Aug. 22-26, 2016, consisting of 6-pages.
3GPP TSG-RAN WG2 #95bis Tdoc R2-166280; Title: Random access on non-anchor carrier; Source: Ericsson Agenda Item: 8.11.2 Non-anchor PRB enhancements; Document for: Discussion, Decision; Location and Date: Kaohsiung, Taiwan, Oct. 10-14, 2016, consisting of 5-pages.
3GPP TSG-RAN WG2 Meeting #96 R2-167816; Title: NPRACH on Non-anchor NB-IoT Carrier; Source: Huawei, HiSilicon, Neul Ltd.; Agenda Item: 8.11.2; Document for: Discussion and Decision; Location and Date: Reno, Nevada, Nov. 14-18, 2016, consisting of 8-pages.
Korean Notice of Preliminary Rejection and English Translation dated Jul. 15, 2020 for Application No. 2019-7023119, consisting of 8-pages.

\* cited by examiner

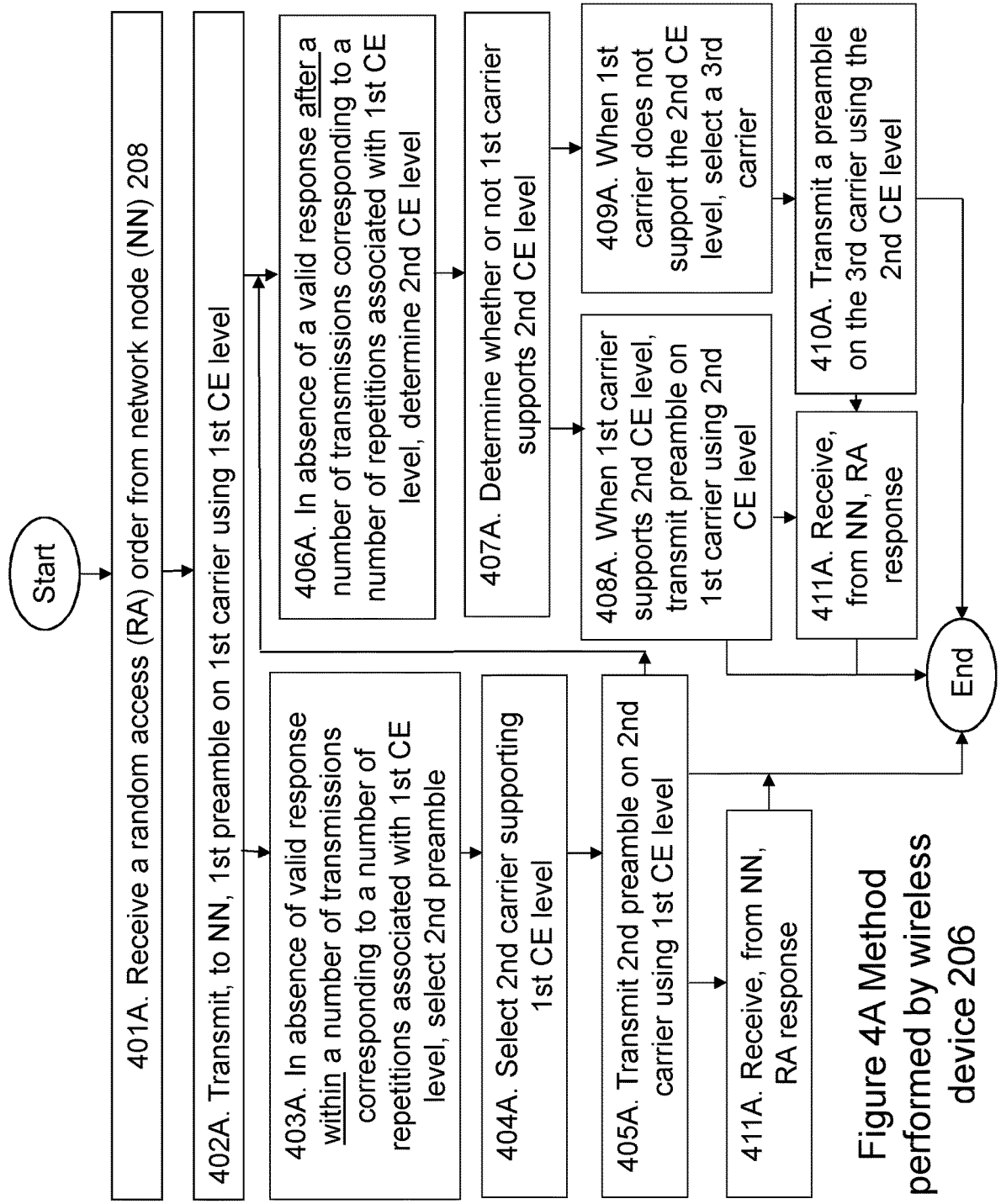
Figure 4A Method performed by wireless device 206

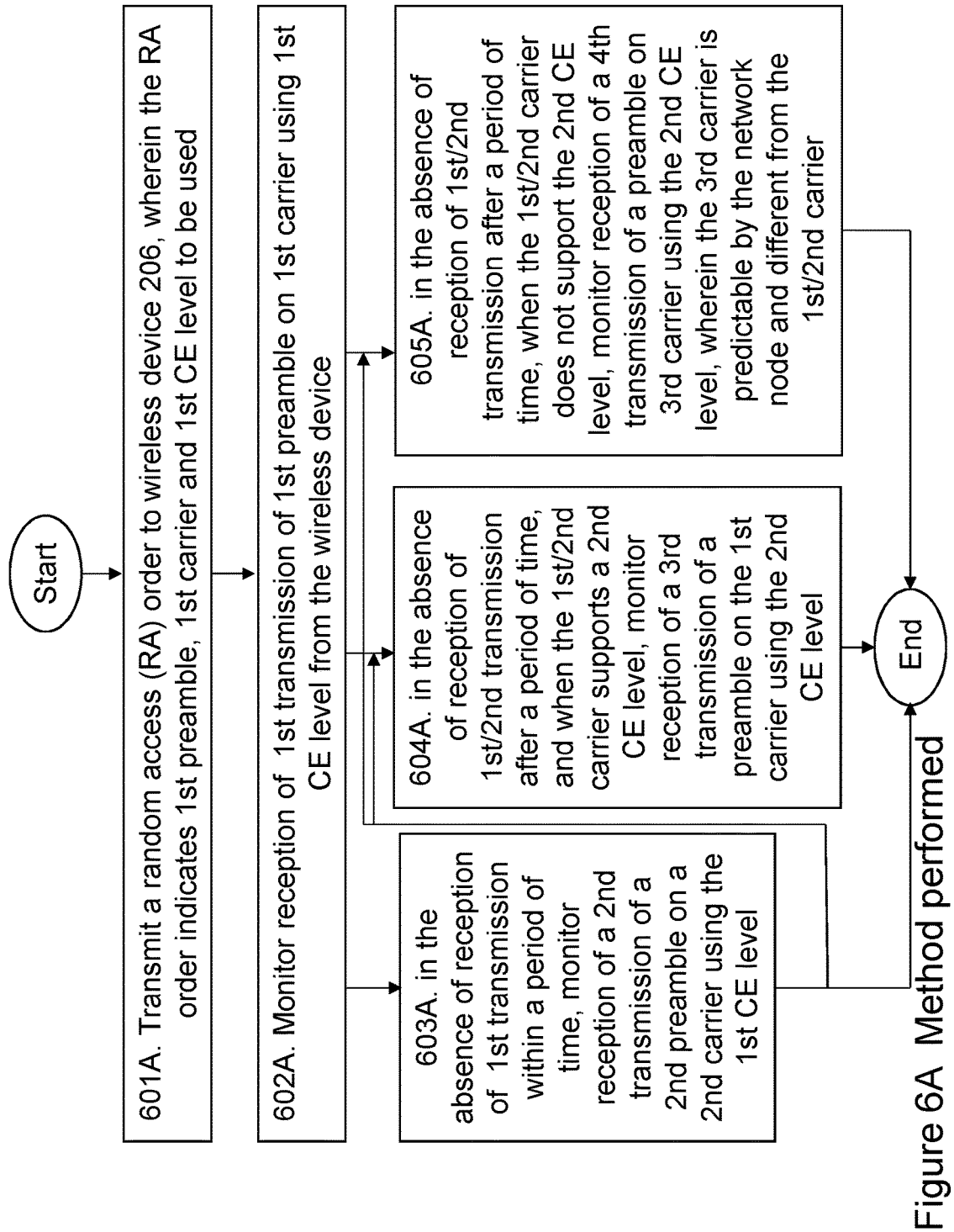
Figure 6A Method performed by network node 208

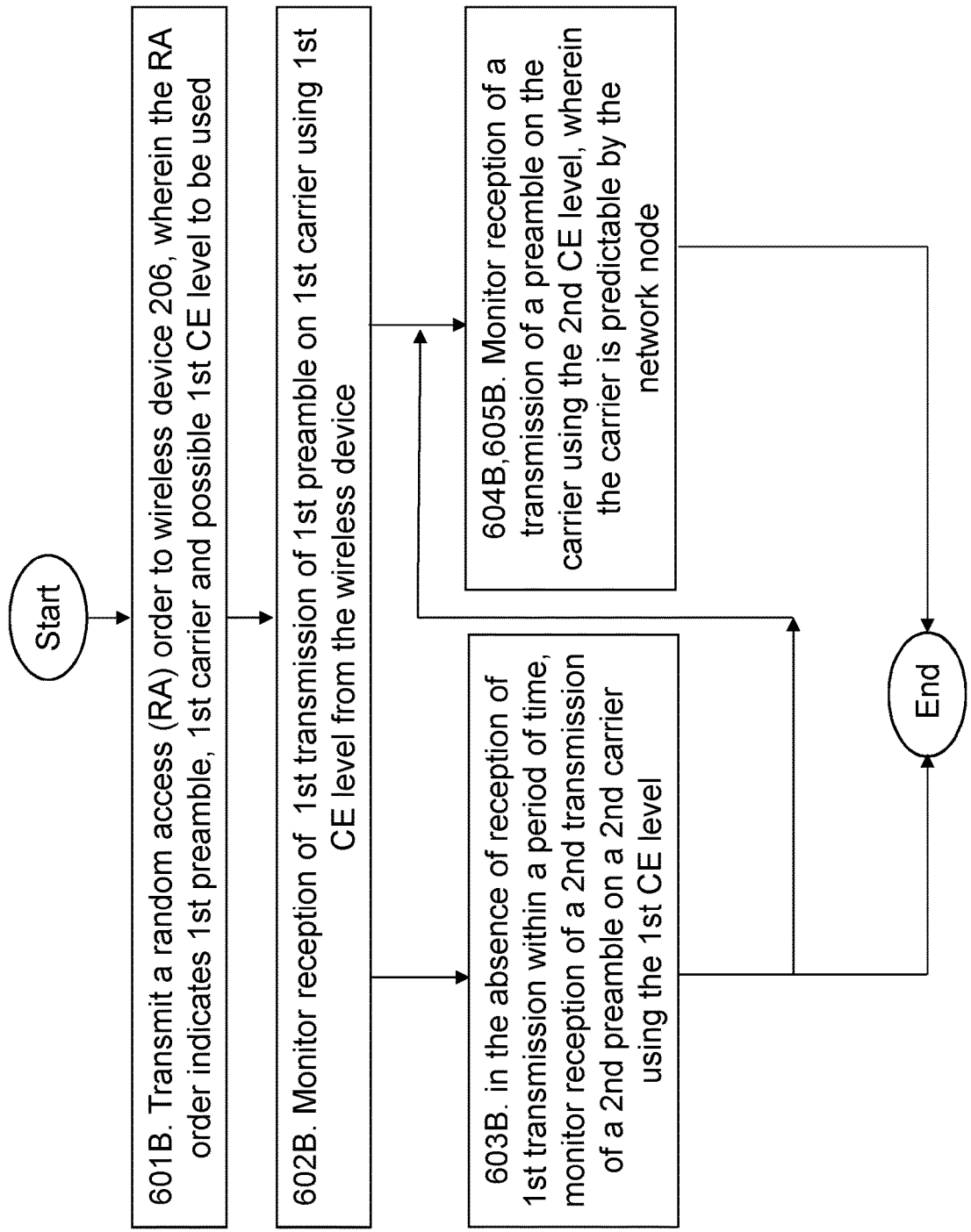
Figure 6B Method performed by network node 208

WIRELESS DEVICE, A NETWORK NODE AND METHODS THEREIN FOR TRANSMISSION AT A CHANGED COVERAGE ENHANCEMENT (CE) LEVEL IN A RANDOM ACCESS PROCEDURE

CROSS-REFERENCE TO RELATED APPLICATIONS

This application is a Submission Under 35 U.S.C. § 371 for U.S. National Stage Patent Application of International Application Number: PCT/SE2017/051120, filed Nov. 10, 2017 entitled "A WIRELESS DEVICE, A NETWORK NODE AND METHODS THEREIN FOR TRANSMISSION AT A CHANGED COVERAGE ENHANCEMENT (CE) LEVEL IN A RANDOM ACCESS PROCEDURE," which claims priority to U.S. Provisional Application No. 62/451,783, filed Jan. 30, 2017, the entireties of both of which are incorporated herein by reference.

TECHNICAL FIELD

Embodiments herein relate to a wireless device, a network node and to methods therein. Especially, embodiments herein relate to transmission at a changed Coverage Enhancement (CE) level in a random access procedure.

BACKGROUND

Communication devices such as terminals or wireless devices are also known as e.g. User Equipments (UEs), mobile terminals, wireless terminals and/or mobile stations. Such terminals are enabled to communicate wirelessly in a wireless communication system or a cellular communications network, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the wireless communications network.

The above terminals or wireless devices may further be referred to as mobile telephones, cellular telephones, laptops, or tablets with wireless capability, just to mention some further examples. The terminals or wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a Radio Network Controller (RNC) or a Base Station Controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3GPP and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In the 3GPP LTE, base stations, which may be referred to as eNodeBs or even eNBs, may be directly connected to one or more core networks.

The 3GPP LTE radio access standard has been written in order to support high bitrates and low latency both for uplink and downlink traffic. All data transmission is in LTE controlled by the radio base station.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

A Narrowband Internet of Things (NB-IoT) communications system is a narrow band communications system developed by the 3GPP for cellular IoT devices. By the expression "narrowband" when used in this disclosures is meant a frequency range of approximately 160-200 kHz, e.g. 180 kHz. The IoT devices are in this disclosure sometimes referred to as just wireless devices. The NB-IoT system is based on existing LTE communications systems and addresses optimized network architecture and improved indoor coverage for massive number of IoT devices with one or more of the following features:

low throughput devices;
low delay sensitivity;
ultra-low device cost; and
low device power consumption.

By the term "low throughput device" when used in this disclosure is meant a wireless device having a throughput of e.g. 2 kbps. This may be compared to normal throughput devices having a throughput in the order of e.g. 100 kbps, and high throughput devices having a throughput in the order of e.g. 1 Mbps.

By the term "low delay sensitivity" when used in this disclosure is meant that the wireless device has a delay sensitivity of approximately 10 seconds.

By the expression "ultra-low device cost" when used in this disclosure is meant that the wireless device is very cheap to manufacture and that the manufacturing cost is only some US dollars, e.g. below five US dollars.

By the expression "low device power consumption" when used in this disclosure is meant that the battery life time of the wireless device is long, e.g. several years such as 10 years.

It is envisioned that each coverage area, e.g. each cell, having a coverage range of approximately 1 square kilometre ($km^2$), in the communications system will serve thousands, e.g. 50 thousands, IoT devices such as sensors, meters, actuators, and alike.

The NB-IoT communications network operates on a 200 kHz carrier and uses a physical layer design similar to the LTE communications network. In particular, the modulation technique, such as an Orthogonal Frequency-Division Multiplexing (OFDM) technique in the downlink and a Single Carrier Frequency-Division Multiple Access (SC-FDMA) technique in the uplink, the frame structure and the subcarrier spacing remain the same. Also, the network layer 2 (L2) and the network layer 3 (L3) in the NB-IoT communications network is very similar to its LTE counterpart.

Two types of carriers exist in the NB-IoT communications network: an anchor carrier and a non-anchor carrier. Each NB-IoT coverage area, e.g. each NB-IoT cell, has one main carrier called the anchor carrier which comprises the synchronization signals, e.g. the Primary Synchronization Signal (PSS) and the Secondary Synchronization Signals (SSS), and system information. In addition to the anchor carrier, a NB-IoT cell may also comprise one or more non-anchor carriers which are assigned to wireless devices in connected mode in order to offload traffic from the anchor carrier to one or more of the one or more non-anchor carriers and thereby increase the communication capacity in the communications network.

Random access may be triggered for wireless devices in connected mode by means of a downlink message called a Physical Downlink Control CHannel order (PDCCH-order). The downlink message is transmitted from a network node, e.g. an eNB, to the wireless device. In the NB-IoT communications network, this special downlink message is primarily used for two purposes.

Firstly, upon new downlink data arrival, the downlink message is transmitted by the network node to re-establish the uplink synchronization of the wireless device after a period of inactivity. The wireless device needs to be uplink synchronized in order to transmit a corresponding acknowledgment (ACK) message or negative acknowledgement (NACK) message in the uplink.

Secondly, the downlink message is transmitted by the network node when timing advance is needed for positioning of the wireless device.

The PDCCH-order indicates a preamble index, sometimes also denoted a subcarrier index, and a Coverage Enhancement (CE) level to be used by the wireless device for a preamble transmission on a Random Access CHannel (RACH). The CE level relates a number of repetitions of a preamble transmission, and thus, different CE levels relate to different numbers of repetitions of the preamble transmission. A communications network, e.g. a network node, may have up to three CE levels configured for RACH where each CE level has an associated set of preambles and an associated repetition number, e.g. an associated number of repetitions, such as an associated number of attempts. The CE level is determined based on the coverage condition of the wireless device and a larger number of repetitions is used for a higher CE level to compensate for an increased path loss. In other words, in order to compensate for a lower single strength a larger number of repetitions is used in order to obtain a higher CE level as compared to when a lower number of repetitions is used.

After the preamble is transmitted from the wireless device, a timer is started in the wireless device and if no response transmitted from the network node is received by the wireless device when the timer expires, the wireless device retransmits the preamble. Up to N attempts are performed before the wireless device starts to perform random access attempts at the next CE level. The number of attempts N is dependent on the CE level. Since the preamble set changes with the CE level and since the number of preambles may be different, the preamble index indicated in the PDCCH-order for the initial CE level may no longer be available for the next CE level. One option may be to randomly select a preamble from the new preamble set, however this may mean that the communications network, e.g. the network node, will no longer in advance know which preamble the wireless device will use. As knowing which preamble the wireless device will use in advance is beneficial in some cases, e.g. when performing positioning and preamble reservation, another method was chosen in 3GPP Release 13 (Rel-13) wherein a new preamble index pi' is derived from the initial preamble index pi as:

$$pi' = pi \bmod pn;$$

wherein pi' is the new preamble index in the new CE level, pi is the initial preamble index indicated in the PDCCH-order, and pn is the number of preambles in the preamble set associated with the new CE level. The wireless device will perform N attempts in the new CE level and if no response is received it performs attempts in the next CE level and so on. This process will continue until the communications network, e.g. the network node, responds or until the maximum number of attempts have been reached.

An example of PDCCH-order triggered random access according to the prior art is illustrated in FIG. 1. As schematically illustrated a network node, e.g. an eNB, transmits a PDCCH-order to a UE. The PDCCH-order comprises information relating to a preamble index, a CE level, and possibly a carrier index. The UE performs $N_{CE\ level\ i}$ transmission attempts of the preamble using a first CE level $CE_{level\ 0}$. In the absence of a response from the network node after the $N_{CE\ level\ i}$ attempt, the UE changes to the next CE level, selects a new preamble index, and performs one or more preamble transmissions attempts based on the new preamble index and using the next CE level. In this example the network node, e.g. the eNB, manages to decode the preamble and responds to the UE after the m:th attempt on the second CE level. The carrier index which is also indicated in the PDCCH-order is related to the 3GPP Release 14 (Rel-14) non-anchor enhancements and is described further below. Note that the FIG. 1 does not show a potential contention resolution step that may occur after the Random Access Response (RAR) is transmitted from the network node. The contention resolution step may comprise transmittal of a message 3 (msg3) and a message 4 (msg4).

A limitation in the 3GPP Rel-13 is that the RACH may only be configured on the anchor carrier. For larger coverage area, e.g. larger cells, with many simultaneous access attempts this means that the RACH quickly becomes a bottleneck when all wireless devices simultaneously perform random access on the anchor carrier. Thus, one of the enhancements introduced in the 3GPP Rel-14 NB-IoT is the ability to configure the RACH also for non-anchor carriers which allows the RACH capacity, e.g. the number of simultaneous random access attempts, to scale with the number of non-anchor carriers. To support the RACH on the non-anchor carriers also for the PDCCH-ordered random access, the PDCCH-order will need to indicate not only the preamble index and the CE level but also the carrier, e.g. the anchor carrier or one out of the one or more non-anchor carriers, to be used for the random access procedure.

Due to backwards compatibility reasons the anchor carrier has to support (i.e. to provide NB-IoT PRACH (NPRACH) resources) all CE levels indicated by the cell. Non-anchor carriers do not have the same restriction and it is possible for a non-anchor carrier to support only a subset of the CE levels. Thus, if a cell indicates that CE levels 0-2 are supported, a non-anchor carrier could provide NPRACH resources for only CE level 2 whereas the anchor carrier would need to provide NPRACH resources for all CE levels.

SUMMARY

As mentioned above, a wireless device that performs random access will move to operate at a next CE level after a certain number of failed preamble transmission attempts on a current CE level. This is sometimes referred to as CE level ramping. For random access triggered by a random access order, e.g. a PDCCH-order, the wireless device may not be able to change CE level if the carrier indicated in the PDCCH-order does not support the next CE level; that is, unless the carrier has NPRACH resources configured for the CE level. This may lead to the wireless device having to abort the random access procedure even though there are other carriers supporting the new CE level. Alternatively, the wireless device may move to the next CE level by changing carrier but if this is done in an uncoordinated manner the communications network, e.g. the network node, will no longer know in advance which carrier the wireless device will access on. As mentioned above, the benefit for the network node, e.g. the eNB, of transmitting the random access order is that the network node will know which random access attempt is from which wireless device. However, if the wireless device changes carrier in an uncoordinated manner, the network node will not know which random access attempt is from the wireless device. For example, this may be problematic if random access is used for positioning of the wireless device when it is changing carrier due to its movement or if the network node should be able to reserve preambles in advance.

Another drawback may be that the wireless device upon CE level change chooses a new preamble index from the complete set of preamble indices associated with the new CE level. As previously mentioned, the new preamble index pi' may be chosen as pi'=pi mod pn; where pn is the number of preambles in the preamble set associated with the CE level on a given carrier. However, in some cases the network node, e.g. the eNB, has different number of preamble indices reserved for contention-based random access and contention-free random access on different carriers, respectively, and then it may be a disadvantage to choose the new preamble index from the complete set of preamble indicies. Further, in other cases such as in positioning cases, the network node, e.g. the eNB, cannot make sure that no other wireless device picks the same preamble index as the intended wireless device.

An aim of some embodiments disclosed herein is to overcome or mitigate at least some of the drawbacks with the prior art.

According to an aspect of embodiments herein, the object is achieved by a method performed by a wireless device for performing a transmission at a changed Coverage Enhancement (CE) level in a random access procedure. The wireless device and a network node operate in a wireless communications network.

The wireless device receives a random access order from the network node, wherein the random access order indicates a first preamble, a first carrier and a possible first CE level to be used.

The wireless device transmits, to the network node, the first preamble on the first carrier using a first CE level.

In the absence of a valid response from the network node after a number of transmissions corresponding to a number of attempts associated with the first CE level, the wireless device determines a second CE level that is different from the first CE level.

The wireless device selects, in a predictable way for the network node, e.g. by using a pre-defined function known by the network node, a carrier is supporting the second CE level, and transmits, to the network node, a preamble on the carrier using the second CE level.

According to another aspect of embodiments herein, the object is achieved by a wireless device for a wireless device for performing a transmission at a changed Coverage Enhancement (CE) level in a random access procedure. The wireless device and a network node are configured to operate in a wireless communications network.

The wireless device is configured to receive a random access order from the network node, wherein the random access order indicates a first preamble, a first carrier and a possible first CE level to be used.

The wireless device is configured to transmit, to the network node, the first preamble on the first carrier using a first CE level.

The wireless device is configured to determine a second CE level that is different from the first CE level in the absence of a valid response from the network node after a number of transmissions corresponding to a number of attempts associated with the first CE level.

The wireless device is configured to select, in a predictable way for the network node, e.g. by using a pre-defined function known by the network node, a carrier that is supporting the second CE level, and configured to transmit, to the network node, a preamble on the carrier using the second CE level.

According to another aspect of embodiments herein, the object is achieved by a method performed by a network node for monitoring reception of a transmission at a changed Coverage Enhancement (CE) level in a random access procedure. A wireless device and the network node operate in a wireless communications network.

The network node transmits a random access order to the wireless device, wherein the random access order indicates a first preamble, a first carrier and a possible first CE level to be used.

Further, the network node monitors reception of a first transmission of the first preamble on the first carrier using a first CE level from the wireless device.

Furthermore, the network node monitors reception of a transmission of a preamble on the carrier using the second CE level, in the absence of reception of the first transmission of the first preamble on the first carrier using the first CE level after a period of time corresponding to a period of time for transmitting a number of attempts associated with the first CE level. The carrier is selected in a predictable way for the network node, e.g. by using a pre-defined function known by the network node.

According to another aspect of embodiments herein, the object is achieved by a network node for monitoring reception of a transmission at a changed Coverage Enhancement (CE) level in a random access procedure. A wireless device and the network node are configured to operate in a wireless communications network.

The network node is configured to transmit a random access order to the wireless device, wherein the random access order indicates a first preamble, a first carrier and a possible first CE level to be used.

Further, the network node is configured to monitor reception of a first transmission of the first preamble on the first carrier using a first CE level from the wireless device.

Furthermore, the network node is configured to monitor reception of a transmission of a preamble on the carrier using the second CE level, in the absence of reception of the first transmission of the first preamble on the first carrier using the first CE level after a period of time corresponding to a period of time for transmitting a number of attempts associated with the first CE level.

According to another aspect of embodiments herein, the object is achieved by a computer program, comprising instructions which, when executed on at least one processor, causes the at least one processor to carry out the method performed by the wireless device.

According to another aspect of embodiments herein, the object is achieved by a computer program, comprising instructions which, when executed on at least one processor, causes the at least one processor to carry out the method performed by the communications network, e.g. a network node.

According to another aspect of embodiments herein, the object is achieved by a carrier comprising the computer program, wherein the carrier is one of an electronic signal, an optical signal, a radio signal or a computer readable storage medium.

Since the wireless device transmits, to the network node, a preamble on a carrier using the second CE level in the absence of a valid response from the network node after a number of transmissions corresponding to a number of attempts associated with the first CE level, and since the wireless device selects, in a predictable way for the network node, e.g. by using a pre-defined function known by the network node, a carrier that is supporting the second CE level, and transmits, to the network node, a preamble on the carrier using the second CE level, the wireless device is able to perform CE level ramping also for PDCCH-ordered random access without any explicit signaling. This results in an improved performance in the wireless communications network.

By coordinating the carrier and/or preamble index change between the wireless device and the network node at a change of CE level, the network node will know the NPRACH resource that will be used for the next random access attempt which is useful for e.g. positioning and resource reservation purposes.

BRIEF DESCRIPTION OF DRAWINGS

Examples of embodiments herein will be described in more detail with reference to attached drawings in which:

FIGS. 4A and 4B are flowcharts depicting embodiments of methods performed by a wireless device;

FIGS. 6A and B are flowcharts depicting embodiments of methods performed by a network node.

DETAILED DESCRIPTION

Figure 1:
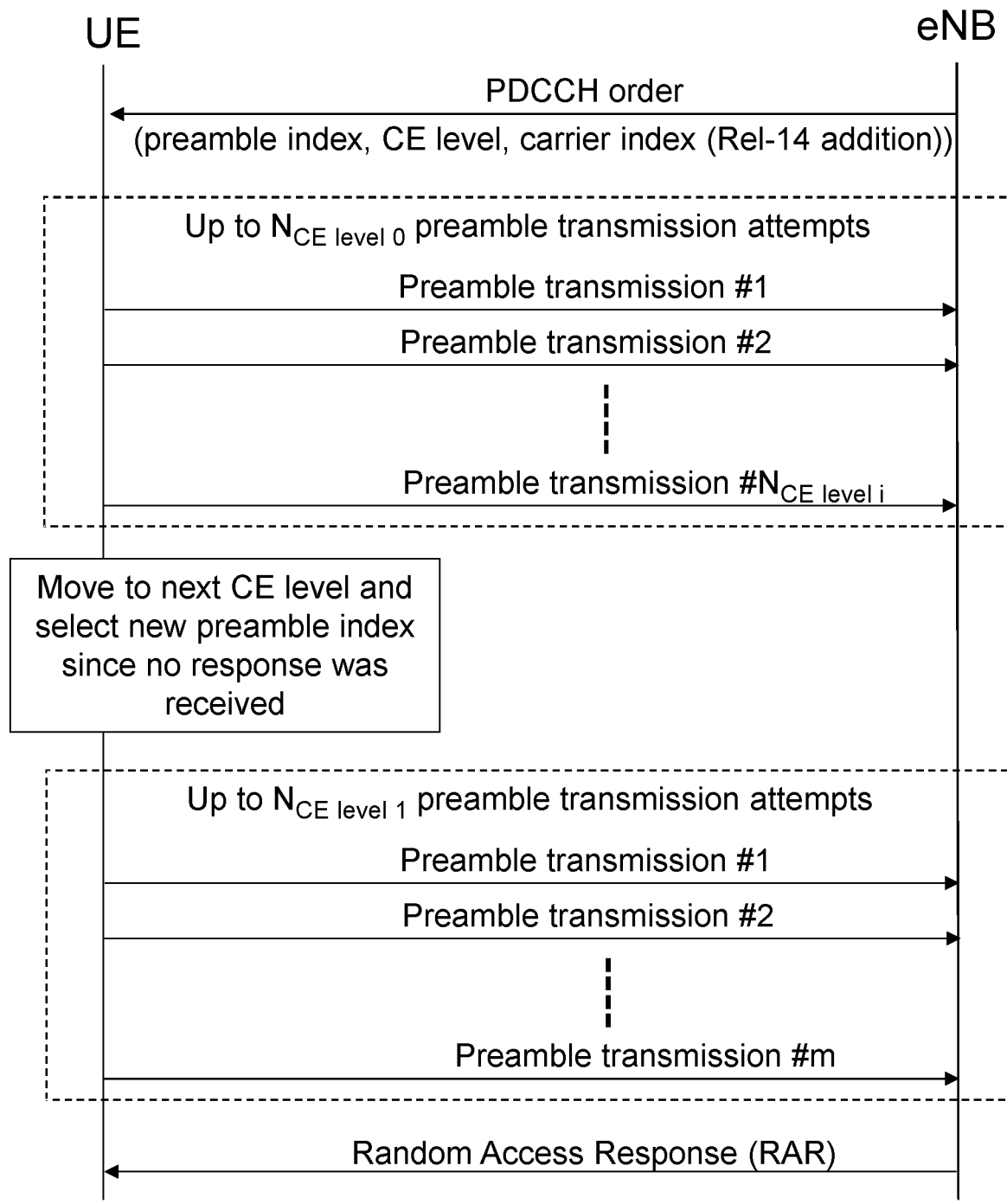
FIG. 1 is a schematic combined flow chart and signalling scheme of a random access procedure according to prior art.

An object addressed by embodiments herein is how to improve performance in a wireless communications network.

Therefore, as mentioned above, according to embodiments herein, a way of improving the performance in the wireless communications network is provided.

Some embodiments herein describe a method for coordinated carrier change and preamble index change at CE level ramping for ordered random access, e.g. for PDCCH-ordered random access. The carrier change and/or the preamble change is sometimes in this disclosure referred to as a change in a NB IoT Physical Random Access CHannel (NPRACH) resource. Thus a reference to a change in a NPRACH resource means a change in carrier and/or preamble. Since the NPRACH resource change is coordinated between a wireless device and a communications network, e.g. a network node, the network node may predict the NPRACH resource that will be used for the random access which is useful for e.g. positioning purposes and resource reservation purposes. In other words, the network node may predict the carrier and/or the preamble index that will be used for the random access.

The wireless device is expected to re-select carrier at CE level ramping if the current carrier does not have any NPRACH resources configured for the new CE level. For simplicity reasons, it may also be so that the wireless device always changes carrier and possibly preamble index at CE level change regardless of whether the current carrier supports the new CE level or not.

One way to coordinate the NPRACH resource change between the wireless device and the network node is to select the new carrier and/or preamble index in a deterministic and pre-defined way from the set of carriers supporting the new CE level and from the set of preamble indices suitable for the purpose. For example, for the purpose of positioning, the network node, e.g. the eNB, may want the wireless device to pick a new preamble index from the set of contention-free preamble indices rather than the complete set of preamble indices including the contention-based preamble indices on which there is a risk of access by other wireless devices. Another option is to extend the information in the PDCCH-order and instead of just indicating the NPRACH resource for the initial CE level, the network node may indicate the carriers and/or preamble indices to be used also for subsequent CE levels. An alternative option, which is simple but more restrictive, is to not allow carrier and/or preamble index changes and instead rely on the network node issuing new PDCCH-order if the random access procedure fails at the current CE level.

Terminology

The following terminology is used in embodiments described herein and is elaborated below:

Network node: In some embodiments a more general term "network node" is used and it may correspond to any type of radio network node or any network node, which communicates with a wireless device and/or with another network node. Examples of network nodes are gNB, NodeB, eNB, MeNB, SeNB, a network node belonging to a Master Cell Group (MCG) or a Secondary Cell Group (SCG), Base Station (BS), multi-Standard Radio (MSR) radio node such as MSR BS, eNodeB, network controller, radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS), core network node (e.g. Mobile Switching Center (MSC), Mobility Management Entity (MME) etc.), Operations and Maintenance (O&M), Operations Support System (OSS), Self-organizing Network (SON), positioning node (e.g. Enhanced Serving Mobile Location Center (E-SMLC)), Mobile Data Terminal (MDT) etc.

User equipment/wireless device: In some embodiments the non-limiting terms wireless device, Mobile Station (MS) and User Equipment (UE) are used and they refer to any type of wireless device communicating with a network node and/or with another UE in a cellular or mobile communication system. Examples of UE/wireless device are Device-to-Device (D2D) UE, machine type UE or UE capable of machine to machine (M2M) communication, Personal Digital Assistant (PDA), Tablet, mobile terminals, smart phone, Laptop Embedded Equipped (LEE), Laptop Mounted Equipment (LME), Universal Serial Bus (USB) dongles, Customer premises Equipment (CPE) etc. In this disclosure the terms wireless device and UE are used interchangeably.

Note that although terminology from Global System for Mobile Communications (GSM) is used in this disclosure to exemplify the embodiments herein, this should not be seen as limiting the scope of the embodiments herein to only the aforementioned system. Other wireless systems, such as for example a NR network, 5G network, an LTE network, a Wideband Code Division Multiple Access (WCDMA) network, a Global System for Mobile Communications (GSM) network, any 3GPP cellular network, a Worldwide Interoperability for Microwave Access (WiMAX) network, a Wireless Local Area Network (WLAN), a Low Rate Wireless Personal Access Network (LR-WPAN) as defined in e.g. IEEE 802.15.4, a Bluetooth network, a SIGFOX network, a Zigbee network, a Bluetooth Low Energy (BLE) network such as a Bluetooth Smart network, or a Cellular Internet of Things (CIoT) network such as an Enhanced Coverage GSM-IoT (EC-GSM-IoT) network, a Narrow Band IoT (NB-IoT) network or a network comprising one or more wireless devices configured for Machine Type Communication (MTC) sometimes herein referred to as an eMTC network, may also benefit from exploiting the ideas covered within this disclosure.

In this section, the embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Also note that terminology such as gNB, eNodeB and UE should be considering non-limiting and does in particular not imply a certain hierarchical relation between the two; in general "eNodeB" could be considered as device 1 and "UE" device 2, and these two devices communicate with each other over some radio channel.

Further, the description frequently refers to wireless transmissions in the downlink, but embodiments herein are equally applicable in the uplink.

In the following section, embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Some exemplifying embodiments will now be described in more detail.

Figure 2:
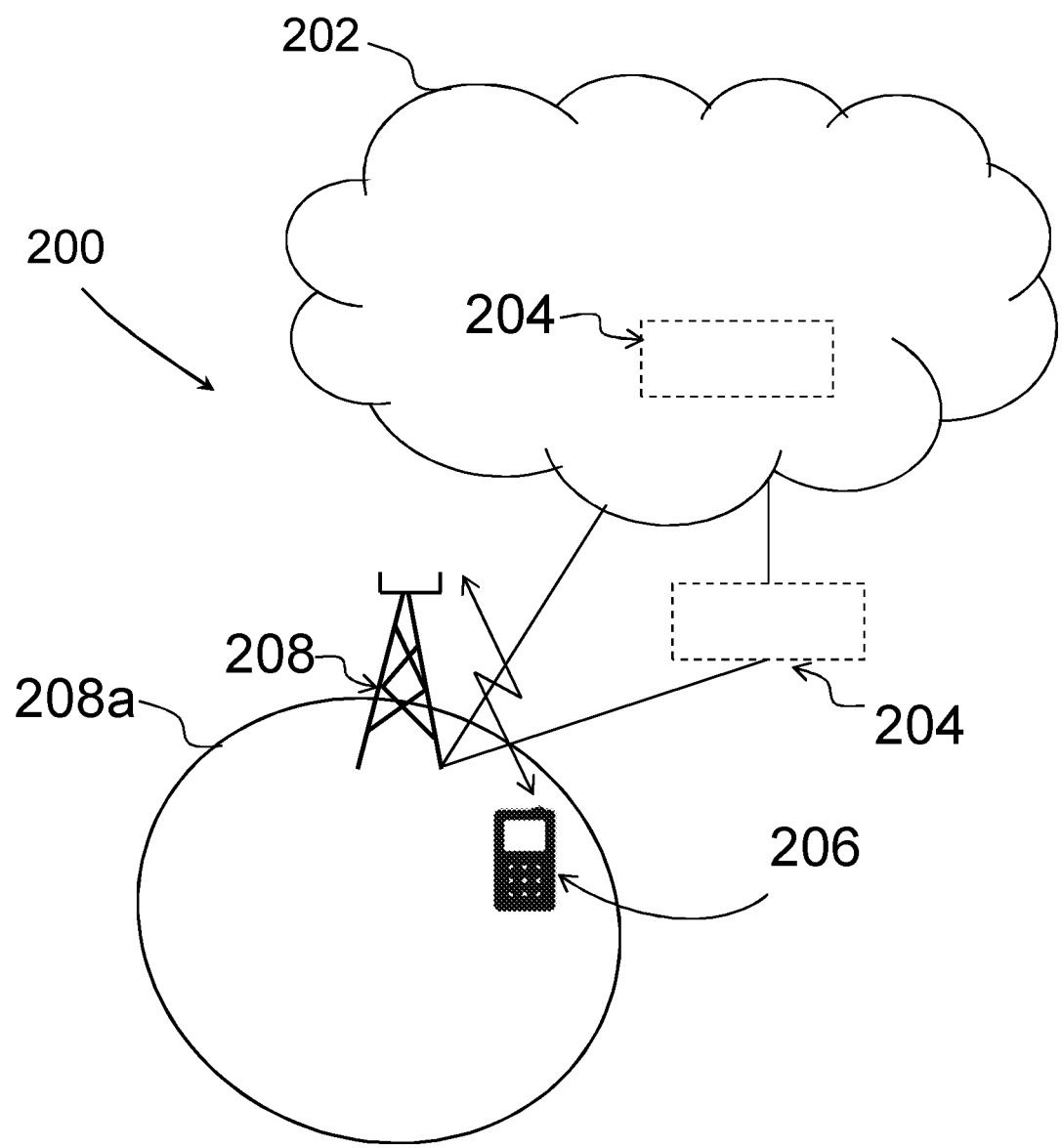
FIG. 2 schematically illustrates embodiments of a wireless communications network.

FIG. 2 depicts an example of the wireless communications network 200 in which embodiments herein may be implemented. The wireless communications network 200 may be a cellular communications network such as a NR network, a 5G network, an LTE network, a WCDMA network, a GSM network, any 3GPP cellular network, or a short range communications network, such as a WLAN, an LR-WPAN, a Bluetooth network, WiMAX network, a SIGFOX network, a Zigbee network, a BLE network such as a Bluetooth Smart network, or a CIoT network such as an EC-GSM-IoT network, a NB-IoT network or an eMTC network, or a combination of one or more of the aforementioned communications networks just to mention some examples.

A core network 202 may be comprised in the communications network 102. The core network 201 may be an NR core network, a 5G core network, an LTE core network, a WCDMA core network, a GSM core network, any 3GPP cellular core network, or a short range communications core network, such as a WLAN core network, an LR-WPAN core network, a Bluetooth core network, WiMAX core network, a SIGFOX core network, a Zigbee core network, a BLE core network such as a Bluetooth Smart network, or a CIoT network such as an EC-GSM-IoT core network, a NB-IoT core network or an eMTC core network, or a combination of one or more of the aforementioned communications core networks just to mention some examples.

A network node 204 may be comprised in or arranged in communication with the core network 202. The network node 204 may be a Radio Network Controller (RNC) operating in an UMTS network. In some embodiments, the network node 204 is a Base Station Controller (BSC), a Mobile Switching Center (MSC), a media Gateway (MGw), a Serving GPRS Support Node (SGSN) or a Mobility Management Entity (MME). Further, in some embodiments, the network node 204 is a base station.

A wireless device 206 is operating in the wireless communications network 200. The wireless device 206, also sometimes referred to as a wireless communications device, a user equipment, a UE, a mobile station or an MS, is located in the wireless communications network 200. The wireless device 206 may e.g. be a IoT device, a user equipment, a mobile terminal or a wireless terminal, a mobile phone, a computer such as e.g. a laptop, a Personal Digital Assistants (PDAs) or a tablet computer, with wireless capability, or any other radio network units capable to communicate over a radio link in a wireless communications network. It should be noted that the term user equipment used in this document also covers other wireless devices such as Machine to Machine (M2M) devices, even though they are not handled by any user. In some embodiments, the wireless device 206 is a stationary wireless device. Thus, the wireless device 206 is sometimes in this disclosure referred to as a stationary wireless device 206. By the expression "stationary wireless device" when used herein is meant that the wireless device 206 is not moving. For example, the stationary wireless device is not moving when in use, e.g. during operation.

A Network Node 208, e.g. a Radio Network Node (RNN), is arranged and configured to operate in the communication network 200. The network node 208 is configured for wireless communication with wireless devices, such as the wireless device 206, when they are located within a coverage area 208a, e.g. a geographical area served by the network node 208. It should be understood that the network node 208 may serve or manage a plurality of coverage areas 208a, even though only one is illustrated in FIG. 2 for clarity reasons. The one more coverage areas 208a are sometimes in this disclosure referred to as one or more cells 208a.

The network node 208 may be a transmission point such as a radio base station, for example an eNB, an eNodeB, or an Home Node B, an Home eNode B or any other network node capable to serve a user equipment or a machine type communication device in a communications network, such as the communications network 200. The network node 208 may further be configured to communicate with the core network node 204.

In order to facilitate the understanding of some embodiments disclosed herein, FIGS. 4A and 4B will be described in more detail before FIG. 3.

Examples of methods performed by the wireless device 206 for performing a transmission at a changed Coverage Enhancement, CE, level in a random access procedure will now be described with reference to flowcharts depicted in FIGS. 4A and 4B. As mentioned above, the wireless device 206 and the network node 208 operate in a wireless communications network 200.

The methods comprise one or more of the following actions. It should be understood that these actions may be taken in any suitable order and that some actions may be combined.

Action 401A, 401B

The wireless device 206 receives a random access order from the network node 208. The random access order may indicate a first preamble, a first carrier and a possible first CE level to be used. The random access order may be a PDCCH-order.

In some embodiments, the random access order comprises a first indicator indicating to the wireless device 206 whether or not carrier change upon re-attempt in the same CE level is to be applied. Thereby, the network node 208 may control whether or not the wireless device 208 should perform carrier change in the same CE level.

Alternatively or additionally, the random access order may comprise a second indicator indicating to the wireless device 206 whether or not the preamble index used for reattempts is to be limited to a contention-free set of preamble indices. The contention-free set of preamble indices comprises preamble indices for which a contention procedure is not required. This may be the case, when for example the preamble indices in the contention-free set is specific for the wireless device 206 and when only one wireless device at the time may use the preamble.

This relates to Action 301 to be described below As will be described in Action 301, the random access order may indicate a NPRACH resource, e.g. a carrier and a preamble. Further, it will be described that the indication of the NPRACH resource may comprise a preamble index, a CE level and a carrier index.

Furthermore, the carrier may be an anchor carrier or a non-anchor carrier.

Action 402A, 402B

The wireless device 206 transmits, to the network node 208, the first preamble on the first carrier using a first CE level.

This relates to Action 302 to be described below. As will be described, the wireless device 206 may transmit the preamble on the NPRACH resource indicated in the PDCCH order. Thus, the wireless device 206 may transmit the first preamble on the first carrier using a first CE level. The first CE level may be the possible first CE level possibly indicated in the random access order or it may be another first CE level, e.g. a first CE level selected by the wireless device 206.

Actions 403A,B-405A,B to be described below relate to the case of preamble and/or carrier selection within the same CE level.

Action 403A, 403B

In the absence of a valid response from the network node 208 within a number of transmissions corresponding to a number of attempts $N_{first\ CE\ level}$ associated with the first CE level, the wireless device 206 may select, in a predictable way for the network node 208, a second preamble possibly different from the first preamble. Thus, the number of performed transmission is lesser than the number of attempts $N_{first\ CE\ level}$ associated with the first CE level, when the wireless device may select the second preamble.

This relates to Action 302 to be described below.

Action 404A, 404B

Further, in the absence of a valid response from the network node 208 within a number of transmissions corresponding to a number of attempts $N_{first\ CE\ level}$ associated with the first CE level, the wireless device 206 may select, in a predictable way for the network node 208, a second carrier supporting the first CE level and possibly being different from the first carrier.

This relates to Action 302 to be described below. As previously mentioned, the wireless device 206 may select the second carrier as a carrier having a carrier index ci', wherein ci' is given by ci'=ci+k, wherein ci is the carrier index of the first carrier and k is the number of re-attempts. Further, k is less than the number of transmissions corresponding to the number of attempts $N_{first\ CE\ level}$ associated with the first CE level.

Action 405A, 405B

The wireless device 206 may transmit the second preamble on the second carrier using the first CE level.

This relates to Action 302 to be described below.

Actions 406A,B-410A,B to be described below relate to the case of preamble and/or carrier selection when changing CE level.

Action 406A, 406B

In the absence of a valid response from the network node 208 after a number of transmissions corresponding to a number of attempts $N_{first\ CE\ level}$ associated with the first CE level, the wireless device 206 may determine a second CE level that is different from the first CE level.

This relates to Actions 303 and 304 to be described below.

Action 407A, 407B

In the absence of a valid response from the network node 208 after a number of transmissions corresponding to a number of attempts $N_{first\ CE\ level}$ associated with the first CE level, the wireless device 206 may determine whether or not the first carrier supports the second CE level.

This relates to Actions 303 and 304 to be described below. As will be described in Action 303, the carrier may be changed at the CE level change. However, it should be understood that the first carrier when supporting the second CE level may be comprised in a set of possible new carriers out of which set a new carrier is to be selected. Therefore, the wireless device 206 may determine whether or not the first carrier supports the second CE level, and if the first carrier supports the second CE level the first carrier should be comprised in the set of possible new carriers.

Action 408A, 408B

When the first carrier supports the second CE level, the wireless device 206 may transmits, to the network node 208, a preamble on the first carrier using the second CE level.

However, as mentioned above, the carrier may be changed at CE level change, and thus the first carrier may be comprised in the set of possible new carriers. Therefore, the wireless device 206 may select a new carrier from the set of possible new carriers and the selected carrier may be the first carrier but it should be understood that it may be another carrier out of the set. Consequently, even if the first carrier supports the second CE level, the wireless device 206 may select a new carrier, which new carrier may be the first carrier but it does not have to. The selection of a new carrier will be described in Action 409 below.

This relates to Actions 303 and 304 to be described below.

Action 409A, 409B

When the first carrier does not support the second CE level, the wireless device 206 may select, in a predictable way for the network node 208, a third carrier that is different from the first carrier and that is supporting the second CE level.

However, as mentioned above, the carrier may be changed at the CE level change, and thus the carrier may be changed even when it does support the second CE level. Therefore, the wireless device 206 may select a new carrier both in the case when the first carrier does support the second CE level and when it does not support the second CE level. Consequently, in Action 409B the wireless device 206 may select, in a predictable way for the network node 208, a new carrier that supports the second CE level. The new carrier may be the first carrier or a third carrier different from the first carrier.

The wireless device 206 may select the new carrier in a predictable way for the network node 208 by using a pre-defined function known to the network node 208.

For example, the wireless device 206 may select, using the pre-defined function, the carrier that is supporting the second CE level, by selecting the carrier having a carrier index ci', wherein ci' is given by ci'=ci mod cn, and wherein ci is the carrier index of the first carrier or an index of a previous carrier and cn is the number of carriers supporting the second CE level.

As another example, the wireless device 206 may select, using the pre-defined function, the carrier that is supporting the second CE level, by selecting the carrier having a carrier index ci', wherein ci' is given by ci'=pi mod cn, and wherein pi is the index of the first preamble or an index of a previous preamble and cn is the number of carriers supporting the second CE level.

This relates to Actions 303 and 304 to be described below.

Action 410A, 410B

The wireless device 206 may transmit, to the network node 208, a preamble on the third carrier using the second CE level.

The preamble may be the first preamble or a third preamble selected in a predictable way for the network node 208 and being different from the first preamble.

The wireless device 206 may select the third preamble in a predictable way for the network node 206 by selecting the third preamble as a preamble having a preamble index pi', wherein pi' is given by pi'=pi mod pn, and wherein pi is an initial preamble index and pn is the number of preambles supporting the second CE level.

This relates to Actions 303 and 304 to be described below.

Action 411

The wireless device 206 may receive a random access response from the network node 208.

This relates to Action 305 described above.

Figure 3:
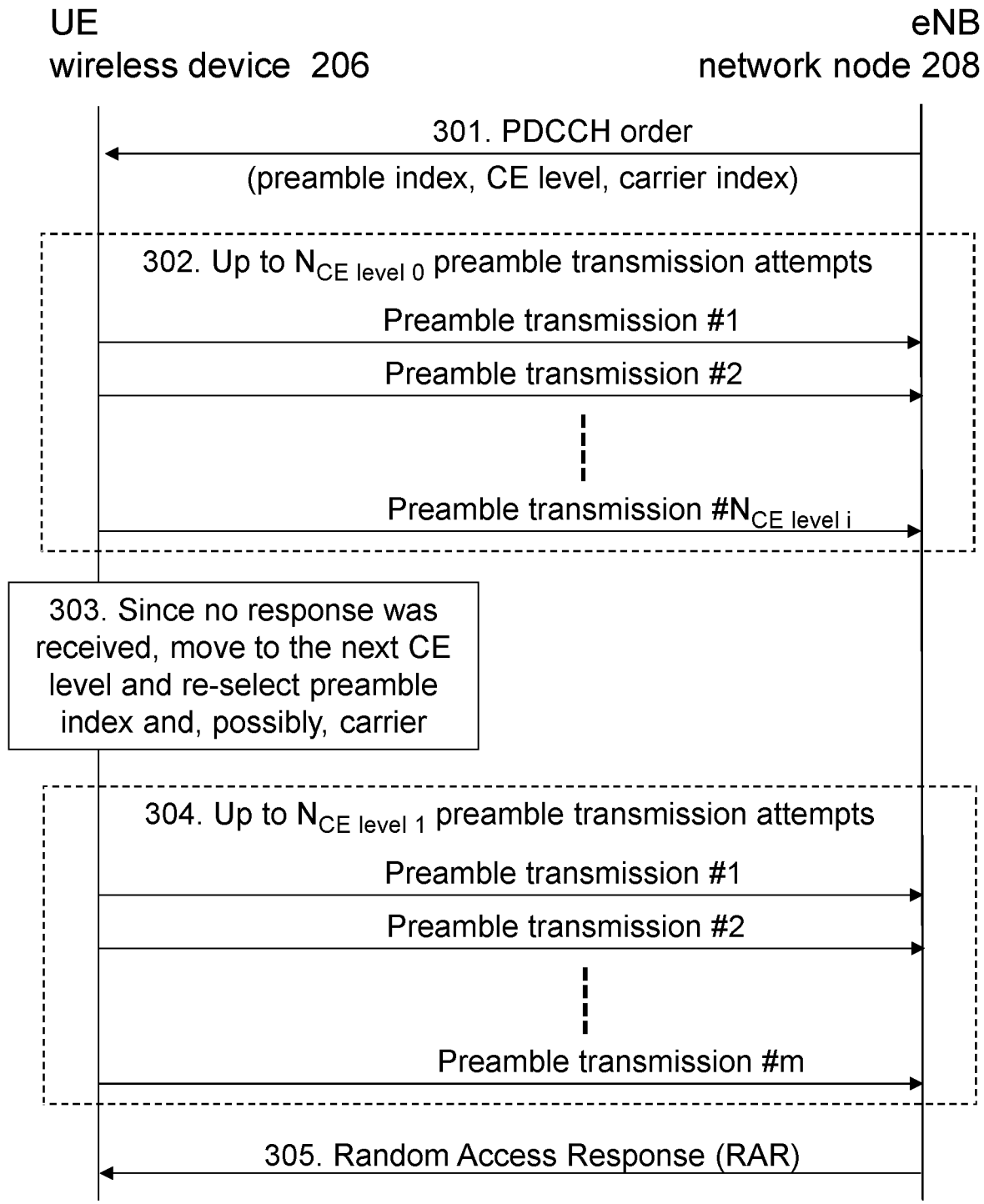
FIG. 3 is a schematic combined flow chart and signalling scheme of embodiments of a wireless communications network.
Figure 4B:
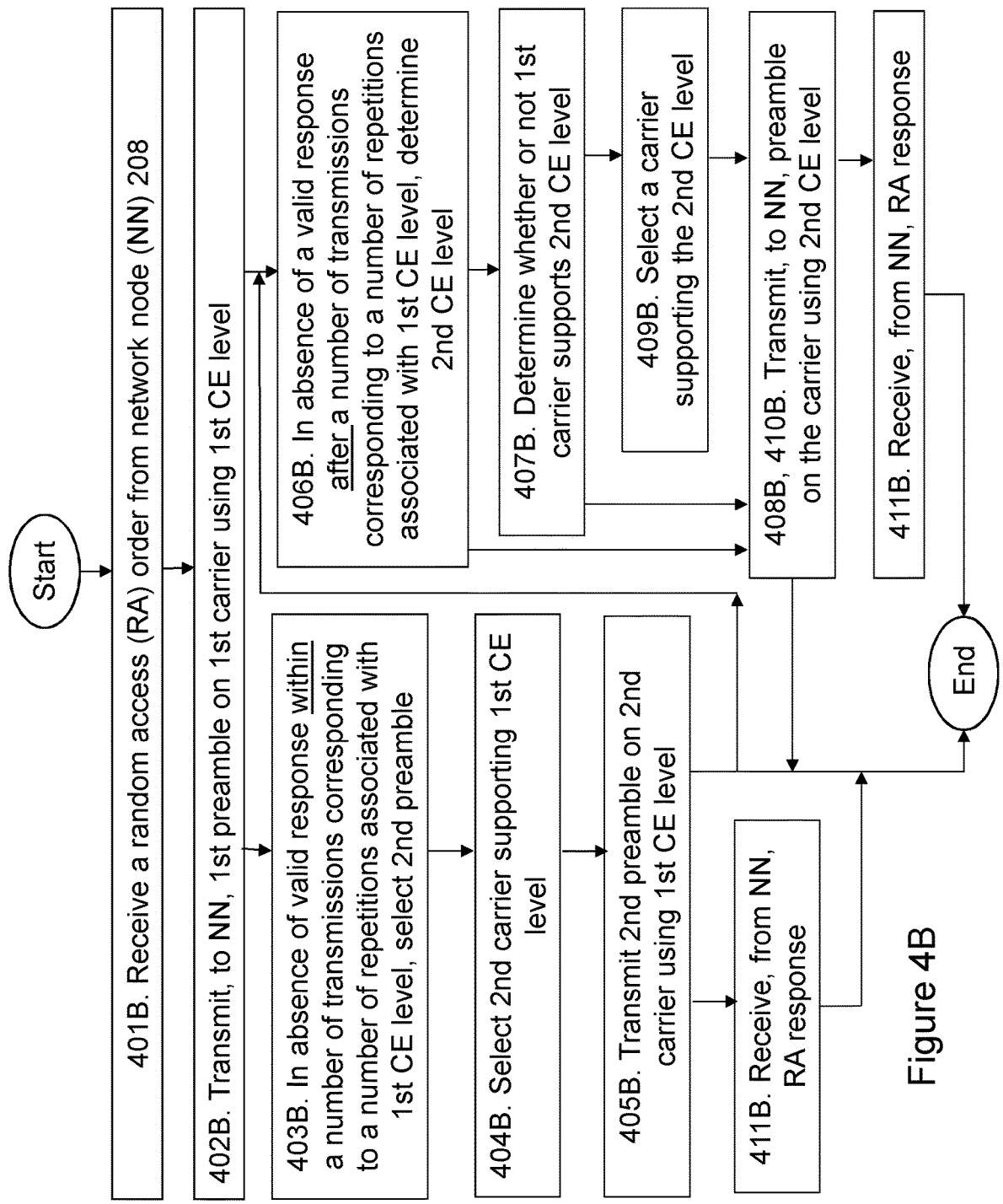

FIG. 3 is a schematic combined flow chart and signalling scheme of embodiments of a wireless communications network 200. Embodiments disclosed herein relate to one or more of the actions below. It should be understood that actions may be optional and that actions may be combined.

An exemplifying description of how carrier and/or preamble index change and CE level ramping is performed for ordered random access, e.g. PDCCH-ordered random access, is provided below. It should be understood that the PDCCH-ordered random access is just given as an example and that embodiments disclosed herein are equally applicable to any random access ordered from a network node. The combined flow chart and signalling scheme of FIG. 3 is used as an example.

Action 301

The network node 208, e.g. the eNB, sends a random access order, e.g. a PDCCH-order, to the wireless device 206 indicating a NPRACH resource, e.g. a carrier and a preamble, to be used by the wireless device for a random access. The indication of the NPRACH resource may comprise a preamble index, a CE level and a carrier index. In this example the starting CE level is set to 0. The carrier may be an anchor carrier or a non-anchor carrier.

Action 302

The wireless device 206 transmits, to the network node 208, the preamble on the NPRACH resource indicated in the PDCCH-order and waits for a response from the network node 208. If no response is received within a certain period of time, or if a response is received but none of the preamble indices listed in the response matches the preamble index used by the wireless device, the wireless device considers the preamble transmission as failed and performs a re-attempt. Up to N (re-)attempts are performed in the current CE level before the wireless device moves the next CE level. N is the number of attempts and depends on the CE level.

In a normal Random Access, i.e. in a random access initiated by the wireless device and not a PDCCH-ordered random access, the wireless device 206 will at re-attempt always randomly re-select the carrier among all those carriers supporting the current CE level. This is not applicable to an PDCCH-ordered random access where any random selection would defy the purpose of explicit indication in the PDCCH-order. One would think that the natural solution for PDCCH-order re-attempts is therefore that the wireless device remains in the same carrier. However, in some embodiments the wireless device could, e.g. to avoid inherent load problems in the first carrier, re-select carrier upon re-attempt in a deterministic and pre-determined manner. This will be described in more detail in relation to points a and b below.

A first indicator, e.g. a 1-bit flag, may be added to the PDCCH-order, the RRC signaling, or the System information in order to indicate to the wireless device 206 whether or not this carrier change upon re-attempt in the same CE level should be applied.

Alternatively or additionally, a second indicator, e.g. a 1-bit flag, may be used to inform the wireless device 206 whether the preamble index used for the reattempt (regardless of whether the reattempt is on the current or another carrier) shall be limited to a contention-free set of preamble indices (rather than the whole set of indices of the intended CE level).

Some examples are given below in regard to carrier and/or preamble index selection upon re-attempts. In all the examples, the wireless device 206 may consider the second indicator (contention-based/free index set indicator) and only consider carriers where preamble indices match the second indicator's intent (e.g. skip carriers that do not have a set of contention-free resources available in case the second indicator aims to point out such preambles).

a. Carrier index cycling: Upon each re-attempt the wireless device increases the carrier index to the next which has NPRACH configured for the current CE level. If e.g. the carriers supporting the current CE level are indexed from 0 to n−1, and the initial carrier index is ci and the number of re-attempt is k (k=0 for initial), the carrier index for a random access re-attempt would in this case be ci'=ci+k (at wraparound the carrier re-starts from index 0).

b. A generalization of the previous options where the wireless device selects the next NPRACH resource (i.e. carrier and/or preamble index) from the set of resources supporting the new CE level using a selection function such as a pre-defined and deterministic function. The previously used carriers and preamble indices may potentially be used as inputs to the selection function.

Action 303

No response is received after N attempts so the wireless device 206 moves to the next CE level. It is further assumed that no NPRACH resources are configured for the next CE level on the current carrier which forces the wireless device 206 to re-select carrier. An alternative here is to always change carrier at CE level change in order to not have different behavior depending on whether the current carrier supports the next CE level or not. This may also overcome any drawbacks due to e.g. load in the assigned carrier. Once the carrier suitable for the new CE level (and matching the intent of the contention-based/free index set indicator if such an indicator is provided/pre-defined) is selected, the wireless device 206 also selects the new preamble index. The following options may be considered for selecting the new carrier. In all cases, the second indicator, e.g. the contention-based/free index set indicator, is taken into consideration:

a. Starting from the carrier with index 0 and increasing the carrier index, the wireless device selects the first carrier supporting the new CE level (i.e. with NPRACH resources configured for the new CE level).

b. Same as the previous option but instead of starting from carrier index 0 the wireless device starts from the current carrier index or the initial carrier index signaled in the PDCCH-order. Compared to the previous option, this option has the advantage that wireless devices will use different carriers if they were assigned different initial carriers in the PDCCH-order.

c. The carriers supporting the new CE level are indexed from 0 to cn−1 and the wireless device derives the new carrier index ci' from a previous carrier index ci. For example, the new carrier index ci' could be calculated as ci'=ci mod cn, wherein ci is the current carrier index or the initial carrier index signaled in the PDCCH-order and wherein cn is the number of carriers supporting the new CE level.

d. Same as the previous option except that the new carrier index is derived from a previous preamble index instead of a previous carrier index.

e. A generalization of all the previous options where the wireless device selects the carrier from the set of carriers supporting the new CE level using a pre-defined and deterministic function. The previously used carriers and preamble indices could potentially be used as inputs to the selection function.

f. The information in the PDCCH-order is extended and indicates the carrier to be used for each CE level.

Action 304

The wireless device 206 performs up to N preamble transmission attempts on the selected carrier and the new CE level. Note again that N depends on the CE level and may be different from the threshold used in Action 302 above. Therefore, sometimes in this disclosure the notation $N_{CE\ level\ 0}$ is used for the number of attempts at CE level 0, $N_{CE\ level\ 1}$ is used for the number of attempts at CE level 1, $N_{CE\ level\ 2}$ is used for the number of attempts at CE level 2, etc.

Action 305

The wireless device 206 receives a valid Random Access Response (RAR) message after the m:th preamble transmission attempt on the new CE level, e.g. CE level 1. In this disclosure valid means that the RAR is received within the random access response window and that the preamble index comprised in the RAR matches the index used by the wireless device 206. Depending on whether the contention free or contention based random access procedure is followed, the random access is either considered completed at this point or the wireless device 206 proceeds with contention resolution. In the latter case the wireless device 206 transmits its identity, e.g. a Cell Radio Network Temporary Identifier (C-RNTI) in a message msg3, which gets echoed back in a message msg4 by the network node, e.g. the eNB, if contention resolution is successful. Only a wireless device which observes a match between the identity received in msg4 and the identity included in msg3 will declare the random access procedure successful. If contention resolution fails, the wireless device will start over from the second action, e.g. Action 302 above, i.e. the preamble transmission, without changing the CE level, the carrier, the preamble index and without re-setting the attempt counter.

An alternative solution is to not allow the wireless device 206 to change carrier. That means that RACH would be restricted to the CE levels supported by the initial carrier. The wireless device 206 may then need to rely on the network node 208, e.g. the eNB, to either assign a carrier supporting all CE levels or issue a new PDCCH-order if the random access procedure fails for the wireless device. The network node 208, e.g. the eNB, is aware of the maximum number of attempts the wireless device 206 will make in the current CE level. The network node 208 may also indicate to the wireless device 206 whether carrier change is allowed or not. The network node 208 may perform such indication to the wireless device 206 either directly in the PDCCH-order, via system information or via dedicated configuration. This may be applied for switching one or more of the solutions mentioned under Action 303 above on and off.

Today, the preamble index 0 in the PDCCH-order has a special significance and means that the wireless device 206 should randomly select a preamble index instead of using the preamble index signaled in PDCCH-order. A similar scheme may be considered also for the carrier selection and a special meaning may be assigned to one of the values for the carrier indication in the PDCCH-order. If this value is signaled the wireless device 206 may randomly select a carrier for each CE level or for each preamble (re-)transmission attempt. This may also be tied to the preamble index so that when for example a preamble index 0 is signaled in the PDCCH-order, the wireless device ignores the carrier indication and instead randomly selects the carrier.

Figure 5:
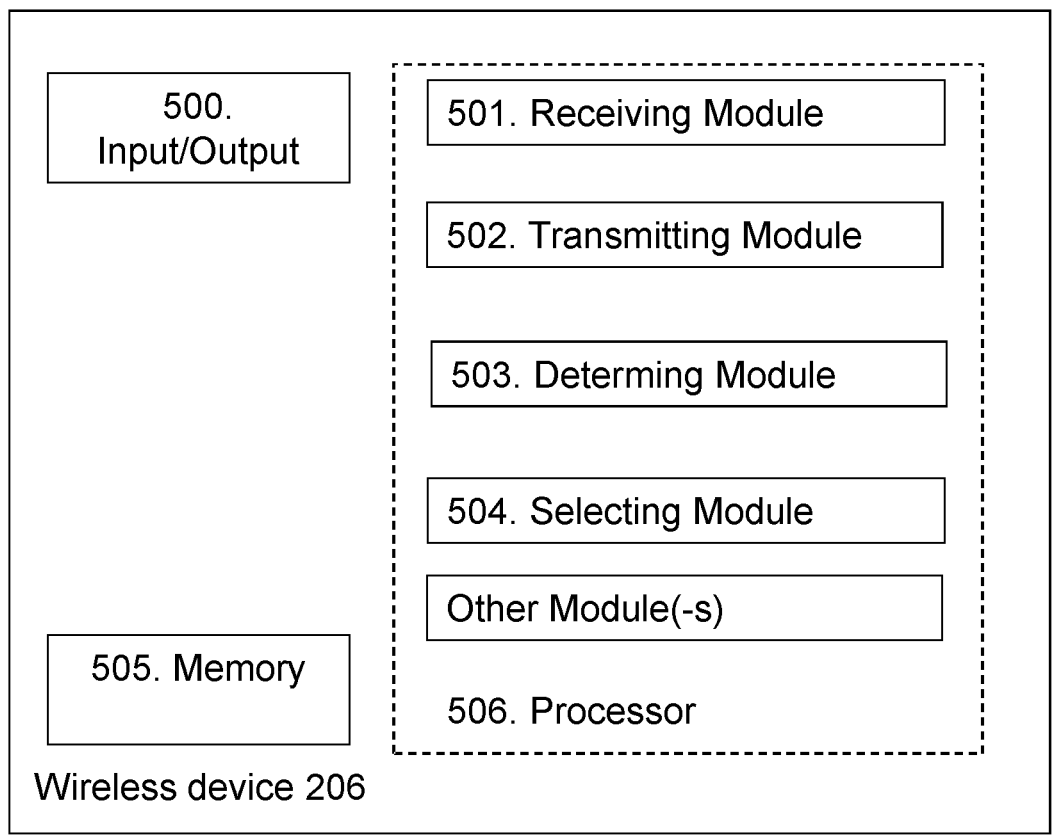
FIG. 5 is a schematic block diagram illustrating embodiments of a wireless device.

To perform the method for performing a transmission at a changed Coverage Enhancement, CE, level in a random access procedure, the wireless device 206 may be configured according to an arrangement depicted in FIG. 5. As previously described, the wireless device 206 and the network node 208 are configured to operate in a wireless communications network 200.

In some embodiments, the wireless device 206 comprises an input and/or output interface 500 configured to communicate with one or more wireless devices, and/or one or more network nodes, e.g. the network node 208. The input and/or output interface 500 may comprise a wireless receiver (not shown) and a wireless transmitter (not shown).

The wireless device 206 is configured to receive, by means of a receiving module 501 configured to receive, a transmission, e.g. a data packet, a signal or information, from one or more network nodes, e.g. the network node 208 and/or from one or more other wireless devices. The receiving module 501 may be implemented by or arranged in communication with a processor 506 of the wireless device 106. The processor 506 will be described in more detail below.

The wireless device 206 is configured to receive a random access order from the network node 208. The random access order may indicate a first preamble, a first carrier and a possible first CE level to be used. The random access order may be a PDCCH-order.

As previously mentioned, the random access order indicates a NPRACH resource, e.g. a carrier and a preamble. Further, the indication of the NPRACH resource may comprise a preamble index, a CE level and a carrier index.

As also previously mentioned and in some embodiments, the random access order comprises a first indicator indicating to the wireless device 206 whether or not carrier change upon re-attempt in the same CE level is to be applied. Thereby, the network node 208 may control whether or not the wireless device 208 should perform carrier change in the same CE level.

Alternatively or additionally, the random access order may comprise a second indicator indicating to the wireless device 206 whether or not the preamble index used for reattempts is to be limited to a contention-free set of preamble indices.

The wireless device 206 is configured to transmit, by means of a transmitting module 502 configured to transmit, a transmission, e.g. a data packet, a signal or information, to one or more network nodes, e.g. the network node 208 and/or to one or more other wireless devices. The transmitting module 502 may be implemented by or arranged in communication with the processor 506 of the wireless device 206.

The wireless device 206 may be configured to transmit, to the network node 208, the first preamble on the first carrier using a first CE level.

As previously mentioned, the wireless device 206 may be configured to transmit the preamble on the NPRACH resource indicated in the PDCCH order. Thus, the wireless device 206 may be configured to transmit the first preamble on the first carrier using a first CE level. The first CE level may be the possible first CE level possibly indicated in the random access order or it may be another first CE level, e.g. a first CE level selected by the wireless device 206.

Further, the wireless device 206 is configured to transmit, to the network node 208, a preamble on a carrier using a second CE level. The preamble may be the first preamble or a third preamble selected in a predictable way for the network node 208 and being different from the first preamble. Further, the carrier may be the first carrier or another carrier supporting the second CE level and being different from the first carrier.

The wireless device 206 may be configured to transmit a second preamble on a second carrier using the first CE level. This may be the case in the absence of a valid response from the network node 208 within a number of transmissions corresponding to a number of attempts $N_{first\ CE\ level}$ associated with the first CE level.

The wireless device 206 is configured to determine, by means of a determining module 503 configured to determine, for example a CE level to be used and/or whether or not a carrier supports a certain CE level. The determining module 503 may be implemented by or arranged in communication with the processor 506 of the wireless device 206.

The wireless device 206 is configured to determine a second CE level that is different from the first CE level and to determine whether or not the first carrier supports the second CE level. This is done in the absence of a valid response from the network node 208 after a number of transmissions corresponding to a number of attempts $N_{first\ CE\ level}$ associated with the first CE level.

The wireless device 206 is configured to select, by means of a selecting module 504 configured to select, a carrier, a preamble and/or a CE level to use. The selecting module 504 may be implemented by or arranged in communication with the processor 506 of the wireless device 206.

The wireless device 206 is configured to select in a predictable way for the network node 208, e.g. by using a pre-defined function known by the network node 208, a carrier that is supporting the second CE level. The wireless device 206 is configured to select the carrier in the absence of a valid response from the network node after a number of transmissions corresponding to a number of attempts $N_{first\ CE\ level}$ associated with the first CE level.

In some embodiments, the wireless device 206 is configured to select, using the pre-defined function, the carrier that is supporting the second CE level, by further being configured to select the carrier having a carrier index ci', wherein ci' is given by ci'=ci mod cn, and wherein ci is the carrier index of the first carrier or an index of a previous carrier and cn is the number of carriers supporting the second CE level.

Alternatively and in some embodiments, the wireless device 206 is configured to select, using the pre-defined function, the carrier that is supporting the second CE level, by further being configured to select the carrier having a carrier index ci', wherein ci' is given by ci'=pi mod cn, and wherein pi is the index of the first preamble or an index of a previous preamble and cn is the number of carriers supporting the second CE level.

In some embodiments, the wireless device 206 is configured to select the third preamble as a preamble having a preamble index pi', wherein pi' is given by pi'=pi mod pn, and wherein pi is an initial preamble index and n is the number of preambles supporting the second CE level.

In some embodiments, for example in the absence of a valid response from the network node 208 within a number of transmissions corresponding to a number of attempts $N_{first\ CE\ level}$ associated with the first CE level, the wireless device 206 is configured to select a second preamble possibly different from the first preamble, and a second carrier supporting the first CE level and possibly being different from the first carrier. The selection should be made in a predictable way for the network node 208.

For example, the wireless device 206 may be configured to select the second carrier by being configured to select the second carrier as a carrier having a carrier index ci', wherein ci' is given by ci'=ci+k, wherein ci is the carrier index of the first carrier and k is the number of re-attempts.

In some embodiments, the wireless device 206 is configured to perform, by means of one or more other modules configured to perform one or more further actions described herein. The one or more other modules may be implemented by or arranged in communication with the processor 506 of the wireless device 206.

The wireless device 206 may also comprise means for storing data. In some embodiments, the wireless device 206 comprises a memory 505 configured to store the data. The data may be processed or non-processed data and/or information relating thereto. The memory 505 may comprise one or more memory units. Further, the memory 505 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the wireless device 206.

Embodiments herein for performing a transmission at a changed Coverage Enhancement, CE, level in a random access procedure may be implemented through one or more processors, such as the processor 506 in the arrangement depicted in FIG. 5, together with computer program code for performing the functions and/or method actions of embodiments herein. The program code mentioned above may also be provided as a computer program product, for instance in the form of a data carrier carrying computer program code for performing the embodiments herein when being loaded into the wireless device 206. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the wireless device 206.

Those skilled in the art will also appreciate that the input/output interface 500, the receiving module 501, the transmitting module 502, the determining module 503, the selecting module 504, and the one or more other modules above may refer to a combination of analogue and digital circuits, and/or one or more processors configured with software and/or firmware, e.g. stored in the memory 505, that when executed by the one or more processors such as the processors in the wireless device 206 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Example of methods performed by the network node 208 for monitoring reception of a transmission at a changed CE level in a random access procedure will now be described with reference to flowcharts depicted in FIGS. 6A and 6B. As mentioned above, the network node 208 and the wireless device 206 operate in the wireless communications network 200.

The methods comprise one or more of the following actions. It should be understood that these actions may be taken in any suitable order and that some actions may be combined.

Action 601A, 601B

The network node 208 transmits a random access order to the wireless device 206. The random access order may indicate a first preamble, a first carrier and a possible first CE level to be used. The random access order may be a PDCCH-order.

As previously mentioned and in some embodiments, the random access order comprises a first indicator indicating to the wireless device 206 whether or not carrier change upon re-attempt in the same CE level is to be applied. Thereby, the network node 208 may control whether or not the wireless device 208 should perform carrier change in the same CE level.

Alternatively or additionally, the random access order may comprise a second indicator indicating to the wireless device 206 whether or not the preamble index used for reattempts is to be limited to a contention-free set of preamble indices. The contention-free set of preamble indices comprises preamble indices for which a contention procedure is not required. This may be the case, when for example the preamble indices in the contention-free set is specific for the wireless device 206 and when only one wireless device at the time may use the preamble.

As previously mentioned, the carrier may be an anchor carrier or a non-anchor carrier.

This relates to Action 301 described above.

Action 602A, 602B

The network node 208 may monitor reception of a first transmission of the first preamble on the first carrier using a first CE level from the wireless device 206.

As previously mentioned, the first CE level may be the possible first CE level possibly indicated by the network node 208 in the random access order or it may be another first CE level, e.g. a first CE level selected by the wireless device 206.

Action 603 to be described below relates to the case of preamble and/or carrier selection within a period of time, e.g. before the expiry of the period of time.

Action 603A, 603B

In the absence of a valid response from the network node 208 within a period of time corresponding to a period of time for transmitting a number of attempts $N_{first\ CE\ level}$ associated with the first CE level, the network node 208 may monitor reception of a second transmission of a second preamble on a second carrier using the first CE level. The second preamble may be the first preamble or a preamble predictable by the network node 208 and different from the first preamble. The second carrier may be the first carrier or a carrier predictable by the network node 208 and different from the first carrier.

Actions 604A,B and 605A,B to be described below relate to the case of preamble and/or carrier selection after expiry of a period of time.

Action 604A, 604B in the absence of reception of the first transmission of the first preamble on the first carrier using the first CE level and/or in the absence of reception of the second transmission of the second preamble on the second carrier using the first CE level after a period of time corresponding to a period of time for transmitting a number of attempts $N_{first\ CE\ level}$ associated with the first CE level, and when the first carrier and/or second carrier supports a second CE level, the network node 208 may monitor reception of a third transmission of a preamble on the first carrier and/or the second carrier using the second CE level.

The preamble may be the first preamble, the second preamble or a third preamble being predictable by the network node 208 and different from the first preamble and/or different from the second preamble.

Action 605A, 605B

In the absence of reception of the first transmission of the first preamble on the first carrier using the first CE level and/or in the absence of reception of the second transmission of the second preamble on the second carrier using the first CE level after a period of time corresponding to a period of time for transmitting a number of attempts $N_{first\ CE\ level}$ associated with the first CE level, and when the first carrier and/or second carrier does not support the second CE level, the network node 208 may monitor reception of a fourth transmission of a preamble on a third carrier using the second CE level. The third carrier may be predictable by the network node 208 and different from the first carrier and/or different from the second carrier.

However, as previously described, the carrier may be changed at a CE level change, and thus the first carrier may be comprised in the set of possible new carriers. Therefore, the wireless device 206 may select a new carrier from the set of possible new carriers and the selected carrier may be the first carrier but it should be understood that it may be another carrier out of the set. Consequently, even if the first carrier supports the second CE level, the wireless device 206 may select a new carrier, which new carrier may be the first carrier or the second carrier but it does not have to. Therefore, the third carrier does not need to be different from the first carrier or the second carrier. Thus, the third carrier may be the first carrier or the second carrier or another carrier supporting the second CE level. In some embodiments, the network node 208 monitors reception of a transmission of a preamble on a carrier using the second CE level.

In some embodiments, the actions 604 and 605 are combined. In such embodiments, and in the absence of reception of the first transmission of the first preamble on the first carrier using the first CE level after a period of time corresponding to a period of time for transmitting a number of attempts $N_{first\ CE\ level}$ associated with the first CE level, the network node 208 monitors reception of a transmission of a preamble on a carrier using the second CE level, wherein the carrier is selected using a pre-defined function known by the network node 208.

The preamble may be the first preamble or a third preamble being predictable by the network node and different from the first preamble.

Figure 7:
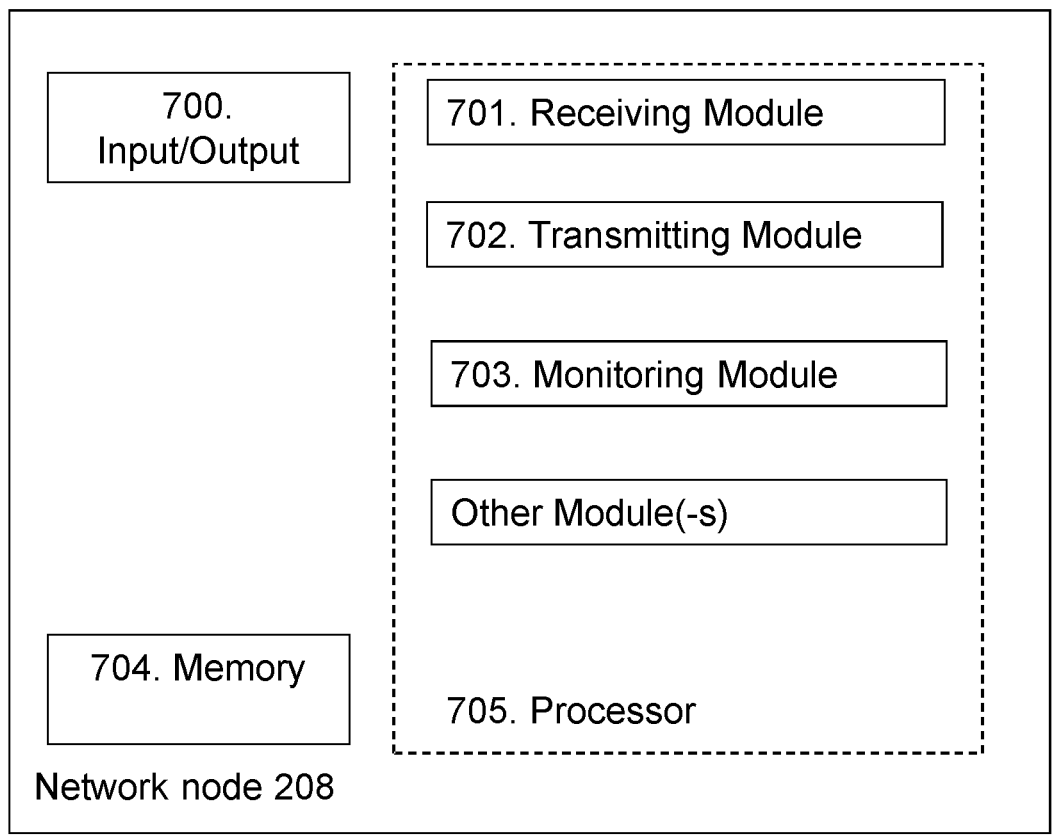
FIG. 7 is a schematic block diagram illustrating embodiments of a network node.

To perform the method for monitoring reception of a transmission at a changed CE level in a random access procedure, the network node 208, may be configured according to an arrangement depicted in FIG. 7. As previously described, the network node 208 and the wireless device 206 are configured to operate in the wireless communications network 200.

In some embodiments, the network node 208 comprises an input and/or output interface 700 configured to communicate with one or more wireless devices, e.g. the wireless device 208 and/or with one or more other network nodes. The input and/or output interface 700 may comprise a wireless receiver (not shown) and a wireless transmitter (not shown).

The network node 208 is configured to receive, by means of a receiving module 701 configured to receive, a transmission, e.g. a data packet, a signal or information, from one or more wireless devices, e.g. the wireless device 206 and/or from one and/or more other network nodes. The receiving module 701 may be implemented by or arranged in communication with a processor 705 of the network node 208. The processor 705 will be described in more detail below.

The network node 208 is configured to transmit, by means of a transmitting module 702 configured to transmit, a transmission, e.g. a data packet, a signal or information, to the wireless device 206 and/or to one or more other network nodes. The transmitting module 702 may be implemented by or arranged in communication with the processor 705 of the network node 208.

The network node 208 is configured to transmit a random access order to the wireless device 206, wherein the random access order indicates a first preamble, a first carrier and a possible first CE level to be used.

In some embodiments, the random access order comprises a first indicator indicating to the wireless device 206 whether or not carrier change upon re-attempt in the same CE level is to be applied.

Alternatively or additionally, the random access order may comprise a second indicator indicating to the wireless device 206 whether or not the preamble index used for reattempts is to be limited to a contention-free set of preamble indices.

The network node 208 may be configured to monitor, by means of a monitoring module 703 configured to monitor, reception of a transmission. The monitoring module 703 may be implemented by or arranged in communication with the processor 705 of the network node 208.

The network node 208 is configured to monitor reception of a first transmission of the first preamble on the first carrier using a first CE level from the wireless device 206.

Further, the network node 208 is configured to monitor reception of a transmission of a preamble on a carrier using the second CE level, wherein the carrier is selected using a pre-defined function known by the network node 208. This may be the case in the absence of reception of the first transmission of the first preamble on the first carrier using the first CE level after a period of time corresponding to a period of time for transmitting a number of attempts $N_{first\ CE\ level}$ associated with the first CE level.

The preamble may be the first preamble or a third preamble being predictable by the network node 208 and different from the first preamble.

In some embodiments, the network node 208 is configured to monitor reception of a second transmission of a second preamble on a second carrier using the first CE level in the absence of a valid response from the network node 208 within a period of time corresponding to a period of time for transmitting a number of attempts $N_{first\ CE\ level}$ associated with the first CE level, wherein the second preamble is the first preamble or a preamble predictable by the network node 208 and different from the first preamble, and wherein the second carrier is the first carrier or a carrier predictable by the network node 208 and different from the first carrier.

In some embodiments, the network node 208 is configured to perform, by means of one or more other modules configured to perform one or more further actions described herein. The one or more other modules may be implemented by or arranged in communication with the processor 705 of the network node 208.

The network node 208 may also comprise means for storing data. In some embodiments, the network node 208 comprises a memory 704 configured to store the data. The data may be processed or non-processed data and/or information relating thereto. The memory 704 may comprise one or more memory units. Further, the memory 704 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the network node 208.

Embodiments herein for monitoring reception of a transmission at a changed CE level in a random access procedure may be implemented through one or more processors, such as the processor 705 in the arrangement depicted in FIG. 7, together with computer program code for performing the functions and/or method actions of embodiments herein. The program code mentioned above may also be provided as a computer program product, for instance in the form of a data carrier carrying computer program code for performing the embodiments herein when being loaded into the network node 208. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the network node 208.

Those skilled in the art will also appreciate that the input/output interface 700, the receiving module 701, the transmitting module 702, the monitoring module 503, the one or more other modules above may refer to a combination of analogue and digital circuits, and/or one or more processors configured with software and/or firmware, e.g. stored in the memory 704, that when executed by the one or more processors such as the processors in the network node 208 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

| ABBREVIATION | EXPLANATION |
|---|---|
| C-RNTI | Cell Radio Network Temporary Identifier |
| E-UTRA | Evolved Universal Terrestrial Radio Access |
| eNB | Evolved Node B |
| LTE | Long Term Evolution |
| MAC | Medium Access Control |
| NB-IoT | NB Internet of Things |
| PDCCH | Physical Downlink Control CHannel |
| RACH | Random Access Channel |
| RRC | Radio Resource Control |
| UE | User Equipment |

-continued

| ABBREVIATION | EXPLANATION |
|---|---|
| S-TMSI | SAE Temporary Mobile Subscriber Identity |
| SAE | System Architecture Evolution |

EMBODIMENTS

Embodiment 1

A method performed by a wireless device (206) for performing a transmission at a changed Coverage Enhancement, CE, level in a random access procedure, wherein the wireless device (206) and a network node (208) operate in a wireless communications network (200), and wherein the method comprises:
  receiving (401A) a random access order from the network node (208), wherein the random access order indicates a first preamble, a first carrier and a first CE level to be used;
  transmitting (402A), to the network node (208), the first preamble on the first carrier using the first CE level;
  in the absence of a valid response from the network node (208) after a number of transmissions corresponding to a number of attempts $N_{first\ CE\ level}$ associated with the first CE level,
  determining (406A) a second CE level that is different from the first CE level,
  determining (407A) whether or not the first carrier supports the second CE level,
  when the first carrier supports the second CE level, transmitting (408), to the network node (208), a preamble on the first carrier using the second CE level; and
  when the first carrier does not support the second CE level:
    selecting (409A), in a predictable way for the network node (208), a carrier that is different from the first carrier and that is supporting the second CE level, and
    transmitting (410A), to the network node (208), a preamble on the carrier using the second CE level.

Embodiment 2

The method of embodiment 1, wherein the preamble is the first preamble or a third preamble selected in a predictable way for the network node (208) and being different from the first preamble.

Embodiment 3

The method of embodiment 1 or 2, comprising:
  in the absence of a valid response from the network node (208) within a number of transmissions corresponding to a number of attempts $N_{first\ CE\ level}$ associated with the first CE level,
  selecting (403A), in a predictable way for the network node (208), a second preamble possibly different from the first preamble,
  selecting (404A), in a predictable way for the network node (208), a second carrier supporting the first CE level and possibly being different from the first carrier, and transmitting (405A) the second preamble on the second carrier using the first CE level.

Embodiment 4

A method performed by a network node (208) for monitoring reception of a transmission at a changed Coverage Enhancement, CE, level in a random access procedure, wherein a wireless device (206) and the network node (208) operate in a wireless communications network (200), and wherein the method comprises:
- transmitting (601A) a random access order to the wireless device (206), wherein the random access order indicates a first preamble, a first carrier and a first CE level to be used;
- monitoring (602A) reception of a first transmission of the first preamble on the first carrier using the first CE level from the wireless device (206);
- in the absence of reception of the first transmission of the first preamble on the first carrier using the first CE level after a period of time corresponding to a period of time for transmitting a number of attempts $N_{first\ CE\ level}$ associated with the first CE level,
  - when the first carrier supports a second CE level, monitoring (604A) reception of a third transmission of a preamble on the first carrier using the second CE level, and
  - when the first carrier does not support the second CE level, monitoring (605A) reception of a fourth transmission of a preamble on a third carrier using the second CE level, wherein the third carrier is predictable by the network node (208) and different from the first carrier.

Embodiment 5

The method of embodiment 4, wherein the preamble is the first preamble or a third preamble being predictable by the network node (208) and different from the first preamble.

Embodiment 6

The method of embodiment 4 or 5, comprising:
- in the absence of a valid response from the network node (208) within a period of time corresponding to a period of time for transmitting a number of attempts $N_{first\ CE\ level}$ associated with the first CE level,
  - monitoring (603A) reception of a second transmission of a second preamble on a second carrier using the first CE level, wherein the second preamble is the first preamble or a preamble predictable by the network node (208) and different from the first preamble, and wherein the second carrier is the first carrier or a carrier predictable by the network node (208) and different from the first carrier.

Embodiment 7

A wireless device (206) for performing a transmission at a changed Coverage Enhancement, CE, level in a random access procedure, wherein the wireless device (206) and a network node (208) are configured to operate in a wireless communications network (200), and wherein the wireless device (206) is configured to:
- receive a random access order from the network node (208), wherein the random access order indicates a first preamble, a first carrier and a first CE level to be used;
- transmit, to the network node (208), the first preamble on the first carrier using the first CE level;
- in the absence of a valid response from the network node (208) after a number of transmissions corresponding to a number of attempts $N_{first\ CE\ level}$ associated with the first CE level,
  - determine a second CE level that is different from the first CE level,
  - determine whether or not the first carrier supports the second CE level,
  - when the first carrier supports the second CE level, transmit, to the network node (208), a preamble on the first carrier using the second CE level; and
  - when the first carrier does not support the second CE level:
    - select, in a predictable way for the network node (208), a third carrier that is different from the first carrier and that is supporting the second CE level, and
    - transmit, to the network node (208), a preamble on the third carrier using the second CE level.

Embodiment 8

The wireless device (206) of embodiment 7, wherein the preamble is the first preamble or a third preamble being predictable by the network node (208) and being different from the first preamble.

Embodiment 9

The wireless device (206) of embodiment 7 or 8, being configured to:
- in the absence of a valid response from the network node (208) within a number of transmissions corresponding to a number of attempts $N_{first\ CE\ level}$ associated with the first CE level,
  - select, in a predictable way for the network node (208), a second preamble possibly different from the first preamble,
  - select, in a predictable way for the network node (208), a second carrier supporting the first CE level and possibly being different from the first carrier, and
  - transmit the second preamble on the second carrier using the first CE level.

Embodiment 10

A network node (208) for monitoring reception of a transmission at a changed Coverage Enhancement, CE, level in a random access procedure, wherein a wireless device (206) and the network node (208) are configured to operate in a wireless communications network (200), and wherein the network node (208) is configured to:
- transmit a random access order to the wireless device (206), wherein the random access order indicates a first preamble, a first carrier and a first CE level to be used;
- monitor reception of a first transmission of the first preamble on the first carrier using the first CE level from the wireless device (206);
- in the absence of reception of the first transmission of the first preamble on the first carrier using the first CE level after a period of time corresponding to a period of time for transmitting a number of attempts $N_{first\ CE\ level}$ associated with the first CE level, when the first carrier supports a second CE level, monitor reception of a third transmission of a preamble on the first carrier using the second CE level, and when the first carrier does not support the second CE level, monitor reception of a fourth transmission of a preamble on a third carrier using the second CE level, wherein the third carrier is predictable by the network node (208) and different from the first carrier.

Embodiment 11

The network node (208) of embodiment 10, wherein the preamble is the first preamble or a third preamble being predictable by the network node (208) and different from the first preamble.

Embodiment 12

The network node (208) of embodiment 10 or 11, further being configured to:
in the absence of a valid response from the network node (208) within a period of time corresponding to a period of time for transmitting a number of attempts $N_{first\ CE\ level}$ associated with the first CE level,
monitor reception of a second transmission of a second preamble on a second carrier using the first CE level, wherein the second preamble is the first preamble or a preamble predictable by the network node (208) and different from the first preamble, and wherein the second carrier is the first carrier or a carrier predictable by the network node (208) and different from the first carrier.

When the word "comprise" or "comprising" is used in this disclosure it shall be interpreted as non-limiting, i.e. meaning "consist at least of".

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed by a wireless device for performing a transmission at a changed Coverage Enhancement, CE, level in a random access procedure, the wireless device and a network node being configured to operate in a wireless communications network, the method comprising:
receiving a random access order from the network node, the random access order indicating a first preamble and a first carrier to be used;
transmitting, to the network node, the first preamble on the first carrier using a first CE level;
in the absence of a valid response from the network node after a number of transmissions on the first carrier corresponding to a number of attempts associated with the first CE level:
determining a second CE level that is different from the first CE level;
selecting, in a predictable way for the network node, a second carrier that is supporting the second CE level, the predictable way being a pre-defined function known by the network node; and
transmitting, to the network node, a preamble on the second carrier using the second CE level.

2. The method of claim 1, comprising:
in the absence of a valid response from the network node after a number of transmissions corresponding to a number of attempts associated with the first CE level:
determining whether the first carrier supports the second CE level.

3. The method of claim 2, further comprising:
when the first carrier supports the second CE level, the transmitting of the preamble comprises:
transmitting, to the network node, the preamble on the first carrier using the second CE level.

4. The method of claim 2, further comprising:
when the first carrier does not support the second CE level, the selecting, in a predictable way for the network node, of the second carrier comprises:
selecting in a predictable way for the network node a third carrier that is different from the first carrier and that is supporting the second CE level; and the transmitting of the preamble comprises:
transmitting, to the network node, the preamble on the third carrier using the second CE level.

5. The method of claim 1, wherein the selecting, in a predictable way for the network node, of the second carrier comprises:
selecting the second carrier using a pre-defined function known by the network node.

6. A method performed by a network node for monitoring reception of a transmission at a changed Coverage Enhancement, CE, level in a random access procedure, a wireless device and the network node being configured to operate in a wireless communications network, the method comprising:
transmitting a random access order to the wireless device, the random access order indicating a first preamble and a first carrier to be used;
monitoring reception of a first transmission of the first preamble on the first carrier using a first CE level from the wireless device; and
in the absence of reception of the first transmission of the first preamble on the first carrier using the first CE level after a period of time corresponding to a period of time for transmitting a number of attempts associated with the first CE level:
monitoring reception of a transmission of a preamble on a second carrier using the second CE level, the second carrier being selected in a predictable way for the network node, the predictable way being a pre-defined function known by the network node, and the second CE level being different from the first CE level.

7. The method of claim 6, wherein the monitoring of the reception of the preamble comprises at least one from the group consisting of:
monitoring reception of a third transmission of the preamble on the first carrier using the second CE level, when the first carrier supports the second CE level; and
monitoring reception of a fourth transmission of the preamble on a third carrier using the second CE level, when the first carrier does not support the second CE level and wherein the third carrier is predictable by the network node and different from the first carrier.

8. The method of claim 6, wherein the preamble is one of: the first preamble; and a third preamble being predictable by the network node and different from the first preamble.

9. A wireless device for performing a transmission at a changed Coverage Enhancement, CE, level in a random access procedure, the wireless device and a network node being configured to operate in a wireless communications network, the wireless device being configured to:
- receive a random access order from the network node, the random access order indicating a first preamble and a first carrier to be used;
- transmit, to the network node, the first preamble on the first carrier using a first CE level;
- in the absence of a valid response from the network node after a number of transmissions on the first carrier corresponding to a number of attempts associated with the first CE level:
  - determine a second CE level that is different from the first CE level;
  - select, in a predictable way for the network node, a second carrier that is supporting the second CE level, the predictable way being a pre-defined function known by the network node; and
  - transmit, to the network node, a preamble on the second carrier using the second CE level.

10. The wireless device of claim 9, being configured to:
- in the absence of a valid response from the network node after a number of transmissions corresponding to a number of attempts associated with the first CE level:
  - determine whether the first carrier supports the second CE level.

11. The wireless device of claim 10, wherein the wireless device is configured to transmit the preamble by being further configured to:
- transmit, to the network node, the preamble on the first carrier using the second CE level, when the first carrier supports the second CE level.

12. The wireless device of claim 10, wherein, when the first carrier does not support the second CE level, the wireless device is configured to select, in a predictable way for the network node, the second carrier by further being configured to select, in a predictable way for the network node, a third carrier that is different from the first carrier and that is supporting the second CE level; and
- wherein the wireless device is configured to transmit the preamble by being configured to transmit, to the network node, the preamble on the third carrier using the second CE level.

13. The wireless device of claim 9, wherein the wireless device is configured to select, in a predictable way for the network node, the second carrier by being further configured to:
- select the second carrier using a pre-defined function known by the network node.

14. The wireless device of claim 13, configured to select, using the pre-defined function, the second carrier that is supporting the second CE level, by being further configured to:
- select the second carrier having a carrier index $ci'$, wherein $ci'$ is given by $ci'=ci \bmod cn$, and wherein $ci$ is one of a carrier index of the first carrier and an index of a previous carrier and $cn$ is the number of carriers supporting the second CE level.

15. The wireless device of claim 13, configured to select, using the pre-defined function, the second carrier that is supporting the second CE level, by being further configured to:
- select the second carrier having a carrier index $ci'$, wherein $ci'$ is given by $ci'=pi \bmod cn$, and wherein $pi$ is one of an index of the first preamble and an index of a previous preamble and $cn$ is the number of carriers supporting the second CE level.

16. The wireless device of claim 9, wherein the preamble is one of the first preamble and a third preamble selected in a predictable way for the network node and being different from the first preamble.

17. The wireless device of claim 16, being configured to:
- select the third preamble as a preamble having a preamble index $pi'$, wherein $pi'$ is given by $pi'=pi \bmod pn$, and wherein $pi$ is an initial preamble index and $n$ is the number of preambles supporting the second CE level.

18. The wireless device of claim 9, wherein the random access order comprises a first indicator indicating to the wireless device whether carrier change upon re-attempt in the same CE level is to be applied.

19. The wireless device of claim 9, being configured to:
- in the absence of a valid response from the network node within a number of transmissions corresponding to a number of attempts associated with the first CE level:
  - select, in a predictable way for the network node, a second preamble possibly different from the first preamble:
  - select, in a predictable way for the network node, a third carrier supporting the first CE level and possibly being different from the first carrier; and
  - transmit the second preamble on the third carrier using the first CE level.

20. The wireless device of claim 19, wherein the wireless device is configured to select the second carrier by being configured to:
- select the third carrier as a carrier having a carrier index $ci'$, wherein $ci'$ is given by $ci'=ci+k$, wherein $ci$ is a carrier index of the first carrier and $k$ is the number of reattempts.

21. The wireless device of claim 9, wherein the random access order comprises a second indicator indicating to the wireless device whether a preamble index used for reattempts is to be limited to a contention-free set of preamble indices.

22. A network node for monitoring reception of a transmission at a changed Coverage Enhancement, CE, level in a random access procedure, a wireless device and the network node being configured to operate in a wireless communications network, and the network node being configured to:
- transmit a random access order to the wireless device, the random access order indicating a first preamble and a first carrier to be used;
- monitor reception of a first transmission of the first preamble on the first carrier using a first CE level from the wireless device; and
- in the absence of reception of the first transmission of the first preamble on the first carrier using the first CE level after a period of time corresponding to a period of time for transmitting a number of attempts associated with the first CE level:
  - monitor reception of a transmission of a preamble on a second carrier using the second CE level, the second carrier being selected in a predictable way for the network node, the predictable way being a pre-defined function known by the network node, and the second CE level being different from the first CE level.

23. The network node of claim 22, being configured to monitor the reception of the preamble by being configured to perform at least one from the group consisting of:
- monitoring of reception of a third transmission of the preamble on the first carrier using the second CE level, when the first carrier supports the second CE level; and
- monitoring of reception of a fourth transmission of the preamble on a third carrier using the second CE level, when the first carrier does not support the second CE level and wherein the third carrier is predictable by the network node and different from the first carrier.

24. A computer storage medium storing a computer program comprising instructions which, when executed on at least one processor of a wireless device, causes the at least one processor to perform a method for transmission at a changed Coverage Enhancement, CE, level in a random access procedure, the wireless device and a network node being configured to operate in a wireless communications network, the method comprising:
- receiving a random access order from the network node, the random access order indicating a first preamble and a first carrier to be used;
- transmitting, to the network node, the first preamble on the first carrier using a first CE level;
- in the absence of a valid response from the network node after a number of transmissions on the first carrier corresponding to a number of attempts associated with the first CE level:
  - determining a second CE level that is different from the first CE level;
  - selecting, in a predictable way for the network node, a second carrier that is supporting the second CE level, the predictable way being a pre-defined function known by the network node; and
  - transmitting, to the network node, a preamble on the second carrier using the second CE level.

25. A computer storage medium storing a computer program comprising instructions which, when executed on at least one processor of a network node, causes the at least one processor to perform a method for monitoring reception of a transmission at a changed Coverage Enhancement, CE, level in a random access procedure, a wireless device and the network node being configured to operate in a wireless communications network, the method comprising:
- transmitting a random access order to the wireless device, the random access order indicating a first preamble and a first carrier to be used;
- monitoring reception of a first transmission of the first preamble on the first carrier using a first CE level from the wireless device; and
- in the absence of reception of the first transmission of the first preamble on the first carrier using the first CE level after a period of time corresponding to a period of time for transmitting a number of attempts associated with the first CE level:
  - monitoring reception of a transmission of a preamble on a second carrier using the second CE level, the second carrier being selected in a predictable way for the network node, the predictable way being a pre-defined function known by the network node, and the second CE level being different from the first CE level.

* * * * *

UNITED STATES PATENT AND TRADEMARK OFFICE
CERTIFICATE OF CORRECTION

PATENT NO. : 11,166,316 B2
APPLICATION NO. : 15/781391
DATED : November 2, 2021
INVENTOR(S) : Ohlsson et al.

It is certified that error appears in the above-identified patent and that said Letters Patent is hereby corrected as shown below:

In the Specification

In Column 9, Line 49, delete "Equipped" and insert -- Equipment --, therefor.

In Column 14, Line 26, delete "Action 411" and insert -- Action 411A, Action 411B --, therefor.

Signed and Sealed this
Eleventh Day of April, 2023

Katherine Kelly Vidal
*Director of the United States Patent and Trademark Office*